United States Patent
Shahvirdi Dizaj Yekan et al.

(10) Patent No.: US 12,294,439 B2
(45) Date of Patent: May 6, 2025

(54) META-STRUCTURE WIRELESS INFRASTRUCTURE FOR BEAMFORMING SYSTEMS

(71) Applicant: BDCM A2 LLC, Dover, DE (US)

(72) Inventors: Taha Shahvirdi Dizaj Yekan, San Diego, CA (US); Maha Achour, Encinitas, CA (US); Jun Fang, San Jose, CA (US); Conny Marx, Sunnyvale, CA (US)

(73) Assignee: BDCM A2 LLP, Dover, DE (US)

( * ) Notice: Subject to any disclaimer, the term of this patent is extended or adjusted under 35 U.S.C. 154(b) by 309 days.

(21) Appl. No.: 17/634,925

(22) PCT Filed: Aug. 12, 2020

(86) PCT No.: PCT/US2020/046009
§ 371 (c)(1),
(2) Date: Feb. 11, 2022

(87) PCT Pub. No.: WO2021/030492
PCT Pub. Date: Feb. 18, 2021

(65) Prior Publication Data
US 2022/0278740 A1 Sep. 1, 2022

Related U.S. Application Data

(60) Provisional application No. 62/926,404, filed on Oct. 25, 2019, provisional application No. 62/885,783, filed on Aug. 12, 2019.

(51) Int. Cl.
*H04B 7/145* (2006.01)
*H01Q 1/24* (2006.01)
(Continued)

(52) U.S. Cl.
CPC ............. *H04B 7/145* (2013.01); *H01Q 1/246* (2013.01); *H01Q 1/38* (2013.01); *H01Q 15/14* (2013.01); *H01Q 19/104* (2013.01)

(58) Field of Classification Search
CPC .......... H04B 7/145; H01Q 1/246; H01Q 1/38; H01Q 15/14; H01Q 19/104
See application file for complete search history.

(56) References Cited

U.S. PATENT DOCUMENTS 3,715,596 A * 2/1973 DeMent ................... G21H 5/00
33/1 HH
5,613,211 A * 3/1997 Matsuno .............. H04B 7/2668
455/512
(Continued)

FOREIGN PATENT DOCUMENTS

| CN | 102480019 A | 5/2012 |
| CN | 203119090 U | 8/2013 |
| CN | 109698407 A | 4/2019 |

OTHER PUBLICATIONS

Tan et al. "Enabling Indoor Mobile Millimeter-wave Networks Based on Smart Reflect-arrays," Apr. 2018, IEEE Infocom 2018—IEEE Conference on Computer Communications pp. 270-278, [retrieved on Nov. 15, 2020]. Retrieved from the internet: <URL: https://cse.buffalo.edu/faculty/dimitrio/publications/infocom18.pdf>.
(Continued)

*Primary Examiner* — Hai V Nguyen
(74) *Attorney, Agent, or Firm* — Dinsmore & Shohl LLP

(57) ABSTRACT

Examples disclosed herein relate to a meta-structure based reflectarray for beamforming wireless applications and a method of operation of passive reflectarrays in an indoor environment. The method includes receiving, by a plurality of passive reflectarrays, a Radio Frequency (RF) signal from a source. The method also includes reflecting, by the plurality of passive reflectarrays, the RF signal to generate a
(Continued)

plurality of RF beams to a respective target coverage area, in which each of the plurality of RF beams increases a multipath gain along a signal path between a corresponding passive reflectarray to the respective target coverage area.

17 Claims, 24 Drawing Sheets

(51) Int. Cl.
*H01Q 1/38* (2006.01)
*H01Q 15/14* (2006.01)
*H01Q 19/10* (2006.01)

(56) References Cited

U.S. PATENT DOCUMENTS

| | | | | |
|---|---|---|---|---|
| 8,912,973 B2* | 12/2014 | Werner | H01Q 15/02 | 343/810 |
| 9,048,544 B2* | 6/2015 | Georgiadis | H01Q 3/42 | |
| 9,184,508 B2* | 11/2015 | Maruyama | H01Q 15/008 | |
| 9,537,221 B2* | 1/2017 | Maruyama | H01Q 15/14 | |
| 9,620,862 B2* | 4/2017 | Maruyama | H01Q 15/14 | |
| 10,042,038 B1* | 8/2018 | Lord | G10L 25/51 | |
| 10,263,342 B2* | 4/2019 | Hand | H01Q 1/38 | |
| 10,324,187 B2* | 6/2019 | Smits | G01S 17/48 | |
| 10,358,637 B2* | 7/2019 | Samli | C12Y 305/01052 | |
| 10,578,869 B2* | 3/2020 | Osterhout | H04N 9/3179 | |
| 10,670,711 B2* | 6/2020 | Devaraj | G01S 13/10 | |
| 10,685,488 B1* | 6/2020 | Kumar | A61H 23/04 | |
| 10,854,985 B2* | 12/2020 | Achour | H01Q 21/065 | |
| 10,892,547 B2* | 1/2021 | Rakib | H01Q 21/065 | |
| 11,041,936 B1* | 6/2021 | Wall | H01Q 1/425 | |
| 11,239,567 B2* | 2/2022 | Freebury | H01Q 19/19 | |
| 11,258,182 B2* | 2/2022 | Shahvirdi Dizaj Yekan | H01Q 15/141 | |
| 11,451,944 B2* | 9/2022 | Achour | H04B 7/155 | |
| 11,546,068 B2* | 1/2023 | Molisch | H04B 17/391 | |
| 11,579,571 B2* | 2/2023 | Shrivastava | G05B 13/0265 | |
| 11,609,324 B2* | 3/2023 | Devaraj | H01Q 9/0435 | |
| 11,630,366 B2* | 4/2023 | Shrivastava | G02F 1/153 | 359/275 |
| 11,631,493 B2* | 4/2023 | Schlameuss | G01N 33/18 | 705/2 |
| 11,664,881 B2* | 5/2023 | Shahvirdi Dizaj Yekan | H04B 7/082 | 375/262 |
| 11,670,833 B2* | 6/2023 | Hughes | H01Q 1/44 | 343/720 |
| 11,732,527 B2* | 8/2023 | Rozbicki | E06B 3/67 | 428/34 |
| 11,740,529 B2* | 8/2023 | Brown | H04L 67/125 | 700/90 |
| 11,750,594 B2* | 9/2023 | Vangati | H04W 4/08 | 713/175 |
| 11,777,225 B2* | 10/2023 | Chang | H01Q 15/0086 | 343/909 |
| 11,796,885 B2* | 10/2023 | Brown | G05B 13/024 | |
| 11,799,187 B2* | 10/2023 | Shrivastava | H01Q 5/25 | |
| 11,848,709 B2* | 12/2023 | Medra | H04B 7/04013 | |
| 11,876,298 B2* | 1/2024 | Achour | H04B 7/15528 | |
| 11,881,624 B2* | 1/2024 | Enescu | H01Q 15/02 | |
| 11,967,766 B2* | 4/2024 | Salman | H01Q 3/2635 | |
| 12,087,997 B2* | 9/2024 | Brown | H04B 7/15507 | |
| 2007/0076163 A1* | 4/2007 | Crossland | G02B 6/264 | 349/196 |
| 2012/0162010 A1* | 6/2012 | Georgiadis | H01Q 3/46 | 342/368 |
| 2013/0229296 A1* | 9/2013 | Maruyama | H01Q 15/008 | 342/5 |
| 2014/0268331 A1* | 9/2014 | Polcyn | G02B 5/3066 | 359/485.02 |
| 2015/0102973 A1* | 4/2015 | Hand | H01Q 21/26 | 343/837 |
| 2015/0229029 A1* | 8/2015 | Maruyama | H01Q 15/14 | 343/912 |
| 2017/0040711 A1* | 2/2017 | Rakib | H01Q 25/002 | |
| 2017/0256861 A1 | 9/2017 | Emmanuel et al. | | |
| 2018/0333135 A1* | 11/2018 | Kim | G01S 3/8086 | |
| 2019/0067826 A1* | 2/2019 | Achour | H01Q 21/065 | |
| 2019/0101640 A1* | 4/2019 | Devaraj | H01Q 19/10 | |
| 2019/0163076 A1* | 5/2019 | Lee | G03F 7/70633 | |
| 2019/0165485 A1* | 5/2019 | Hand | H01Q 3/46 | |
| 2019/0206136 A1* | 7/2019 | West | G02B 27/0172 | |
| 2020/0358200 A1* | 11/2020 | Freebury | H01Q 15/14 | |
| 2020/0381839 A1* | 12/2020 | Shahvirdi Dizaj Yekan | H01Q 15/0086 | |
| 2021/0058137 A1* | 2/2021 | Shahvirdi Dizaj Yekan | H01Q 3/16 | |
| 2021/0058754 A1* | 2/2021 | Acour | H04B 7/155 | |
| 2021/0066813 A1* | 3/2021 | Salman | H01Q 5/371 | |
| 2021/0364936 A1* | 11/2021 | Pandey | G01N 29/0681 | |
| 2022/0052764 A1* | 2/2022 | Medra | H04B 10/614 | |
| 2022/0247076 A1* | 8/2022 | Fang | H04B 7/145 | |
| 2024/0275074 A1* | 8/2024 | Achour | H04B 7/15507 | |

OTHER PUBLICATIONS

Chinese Office Action dated Mar. 5, 2025.

* cited by examiner

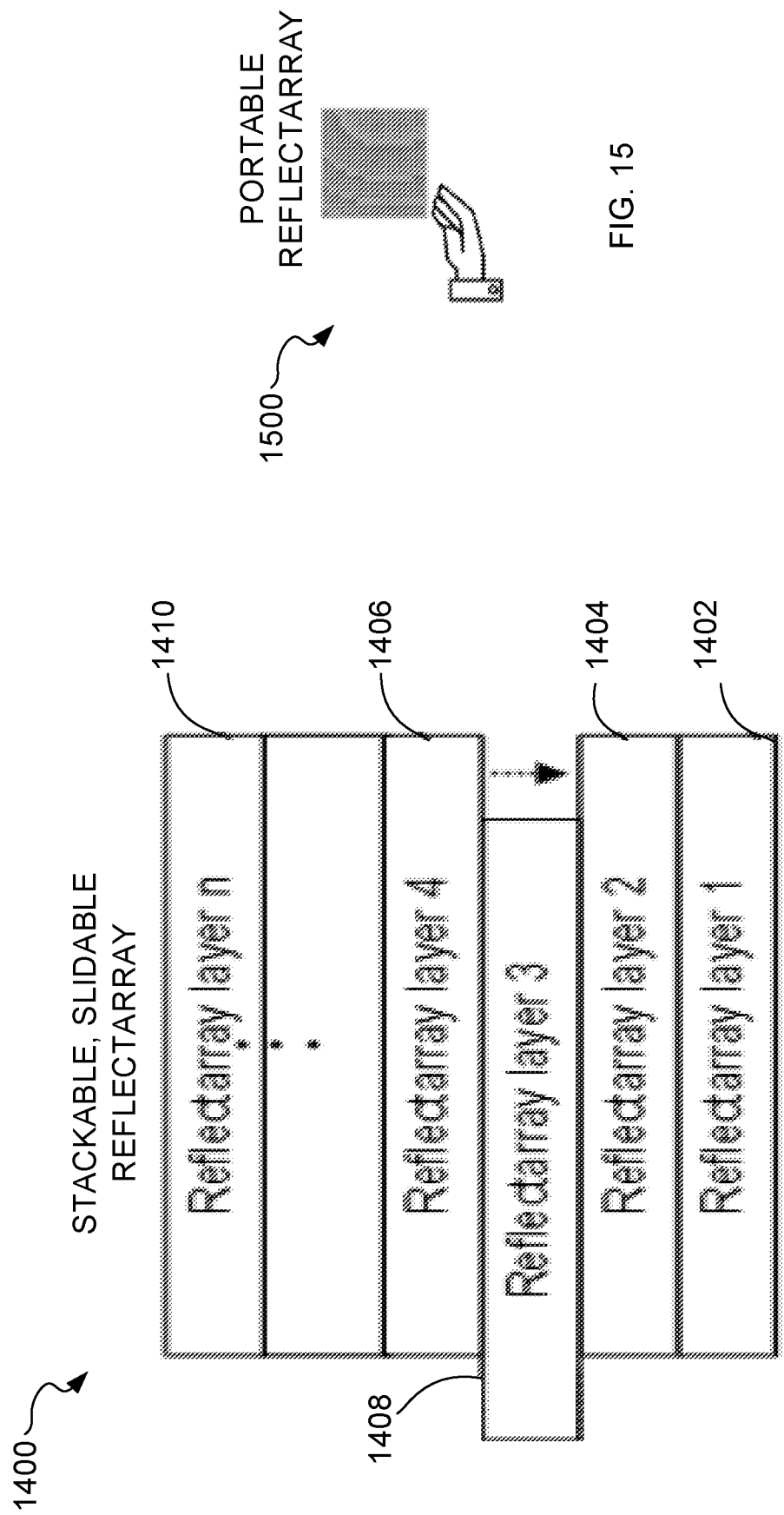

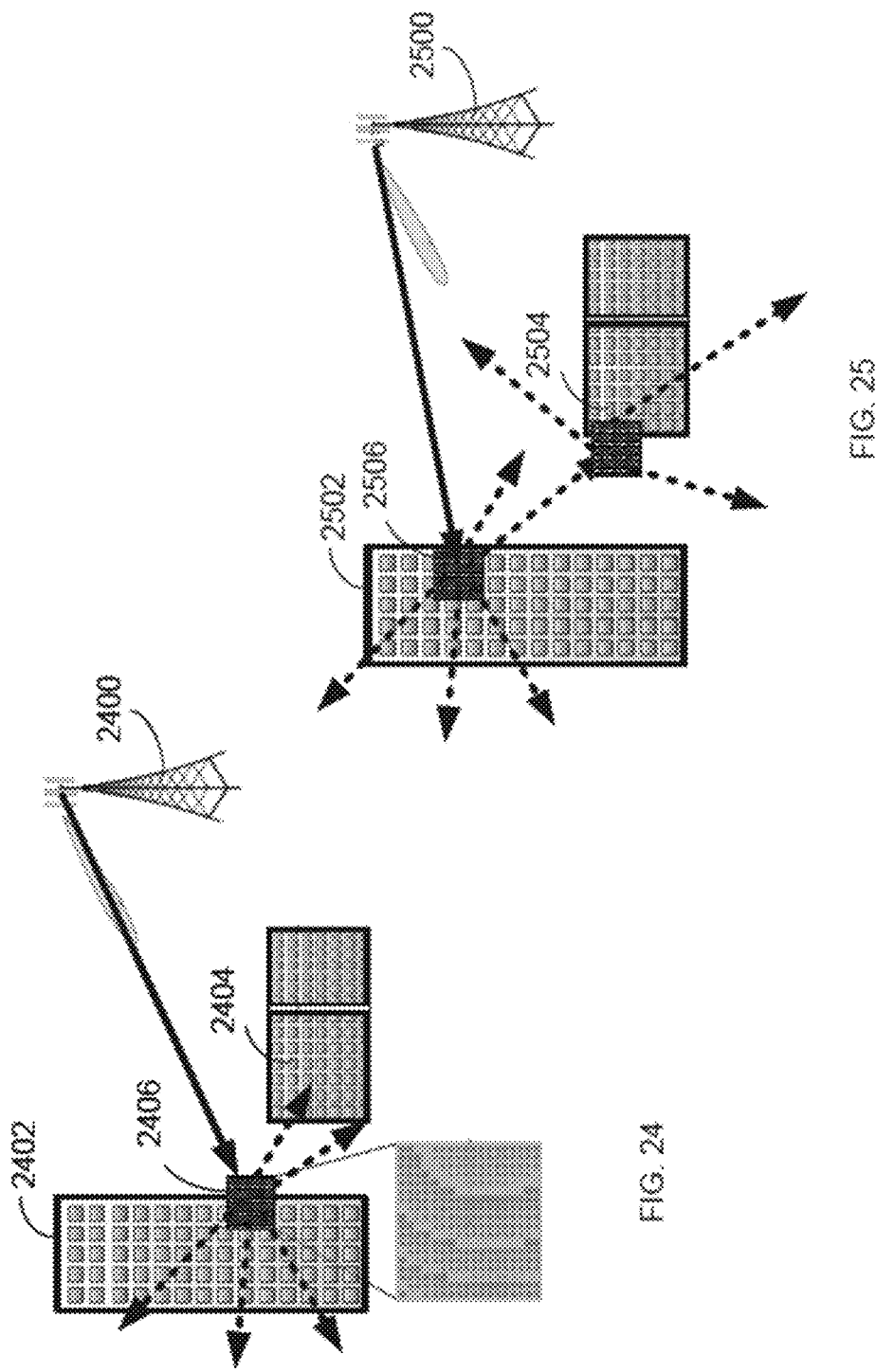

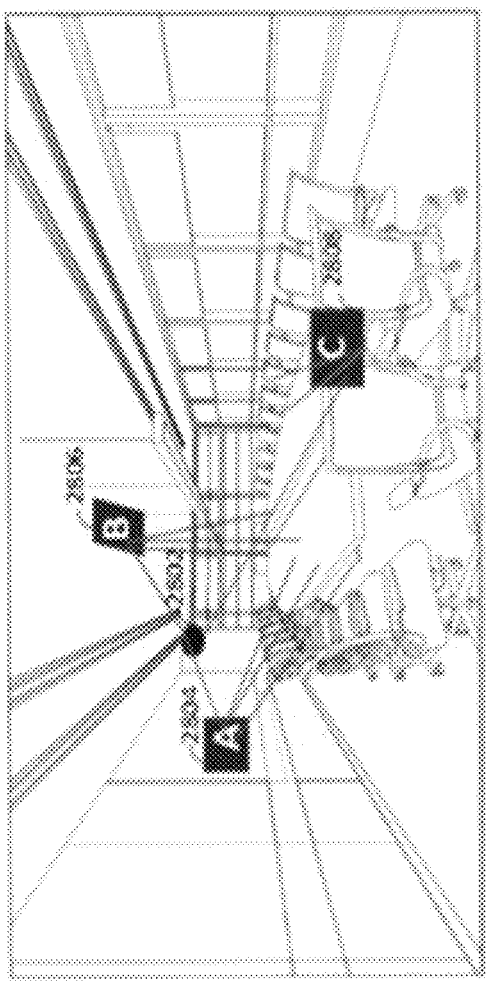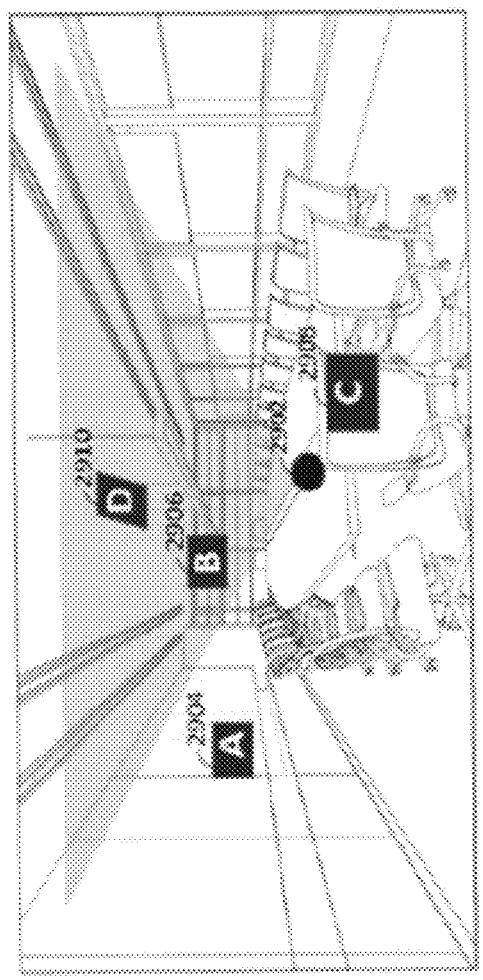

ated Patent
META-STRUCTURE WIRELESS INFRASTRUCTURE FOR BEAMFORMING SYSTEMS

PRIORITY CLAIM

The present application for patent is a U.S. national stage application under 35 U.S.C. § 371 of International Patent Application No. PCT/US2020/046009, filed Aug. 12, 2020, which claims priority to U.S. Provisional Application No. 62/885,783, filed on Aug. 12, 2019; and to U.S. Provisional Application No. 62/926,404, filed on Oct. 25, 2019, all of which are incorporated by reference herein in their entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G") which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms. These and other challenges in providing millimeter wave wireless communications for 5G networks impose ambitious goals on system design, including the ability to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein

FIG. 5 illustrates a 5G application in which a MTS reflectarray is used to improve wireless coverage and performance in accordance to various examples;

FIG. 14 is a schematic diagram of a stackable, slidable reflectarray having multiple reflectarray layers in accordance to various examples;

FIG. 15 illustrates a portable reflectarray in accordance to various examples;

FIG. 24 illustrates a MTS reflectarray operating as a relay to increase the coverage area of the RF signal in accordance to various examples;

FIG. 25 illustrates two MTS reflectarrays operating together as relays to increase the coverage area of the RF signal in accordance to various examples;

FIG. 28 illustrates a schematic diagram of an example of an indoor environment having a deployment of passive reflectarrays that enrich multipath signaling with a wireless radio at a second location in accordance to various examples;

FIG. 29 illustrates a schematic diagram of an example of an indoor environment having a deployment of passive reflectarrays with enhanced uplink signaling to a wireless radio in accordance to various examples;

DETAILED DESCRIPTION

Meta-Structure based reflectarrays for enhanced 5G applications are disclosed, which are applicable to a variety of wireless systems and specifically to directed beam system where the transmitters are beamforming units. The beamforming transmitters operate to transmit narrow beams in specific directions, and are often range limited due to the high frequency and or gain requirements. The reflectarrays are suitable for many different 5G applications and can be deployed in a variety of environments and configurations. In various examples, the reflectarrays are arrays of cells having meta-structure reflector elements that reflect incident radio frequency ("RF") signals in specific directions. In some embodiments the reflectarray includes at least one metamaterial cell. An incident wave 110 from BS 100 is illustrated as directed to Reflectarray 106. A meta-structure, as generally defined herein, is an engineered, non- or semi-periodic structure that is spatially distributed to meet a specific phase and frequency distribution. A meta-structure reflector element is designed to be very small relative to the wavelength of the reflected RF signals. A reflected electromagnetic (EM) wave 112 is illustrated from reflectarray 106 toward NLOS 114. The reflectarrays are able to operate at the higher frequencies required for 5G and at relatively short distances. Their design and configuration are driven by geometrical and link budget considerations for a given application or deployment, whether indoors or outdoors.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
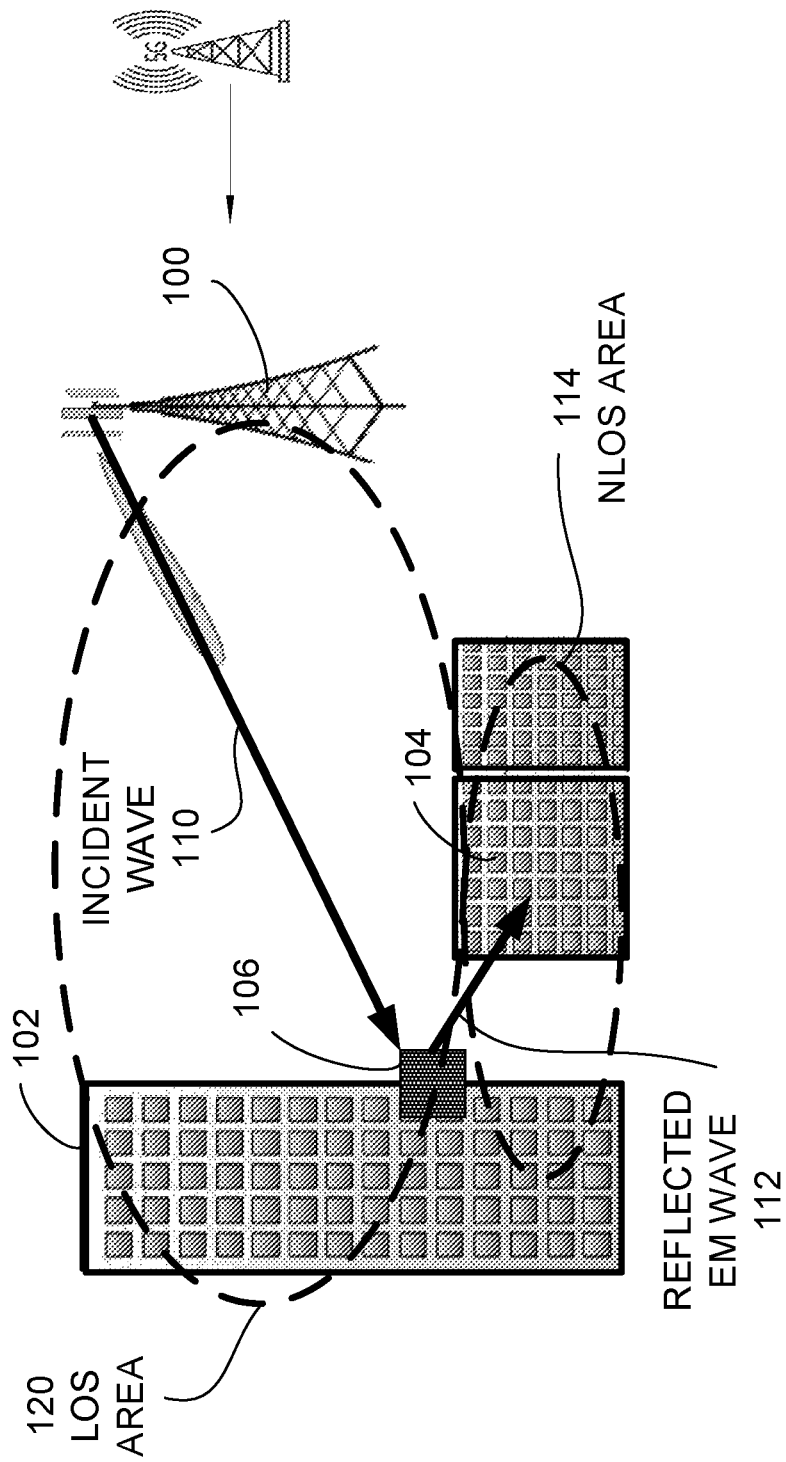
FIG. 1 illustrates an environment in which a meta-structure ("MTS") reflectarray is deployed for 5G applications in accordance to various examples.

FIG. 1 illustrates an environment in which a meta-structure ("MTS") based reflectarray is deployed for 5G applications according to various examples. Wireless base station ("BS") 100 transmits and receives wireless signals from mobile devices within its coverage area. The coverage area may be disrupted by buildings or other structures in the environment, which may affect the quality of the wireless signals. In the illustrated example, buildings 102 and 104 affect the coverage area of BS 100 such that it has a Line-of-Sight ("LOS") zone 120. Users of devices outside of this zone may have either no wireless access, significantly reduced coverage, or impaired coverage of some sort. With the high frequency bands used for 5G, it is difficult to expand the coverage area outside the LOS zone 120 of BS 100. The present inventions provide solutions for the wireless industry that incorporate reflectarrays, repeaters and operate using the reflection of radio waves.

Wireless coverage can be significantly improved to users outside of the LOS zone 120 by the installation of a MTS based reflectarray 106 on a surface of building 102 (e.g., wall, window, etc.) Reflectarray 106 is a robust and low-cost relay that is positioned as illustrated between BS 100 and user equipment ("UE") (e.g., a UE in building 104) to significantly improve network coverage. As illustrated, reflectarray 106 is formed, placed, configured, embedded, or otherwise connected to a portion of building 102. Although a single reflectarray 106 is shown for illustration purposes, multiple such reflectarrays may be placed in external and/or internal surfaces of building 102 as desired.

In various examples, reflectarray 106 is able to act as a relay between BS 100 and users within or outside of its LOS zone 120. Users in a Non-Line-of-Sight ("NLOS") zone 104 are able to receive wireless signals from the BS 100 that are reflected off the reflectarray 106. With respect to BS 100 any area outside of LOS 120 is a NLOS area, however, for purposes of this example, the solution is to provide coverage to the NLOS area 112. Various configurations, shapes, and dimensions may be used to implement specific designs and meet specific constraints. The reflectarray 106 can be designed to directly reflect the wireless signals from BS 100 in specific directions from any desired location in the illustrated environment, be it in a suburban quiet area or a high traffic, high density city block. Use of a reflectarray such as reflectarray 106 and designed as disclosed herein can result in a significant performance improvement of multiple times current 5G data rates.

Figure 2:
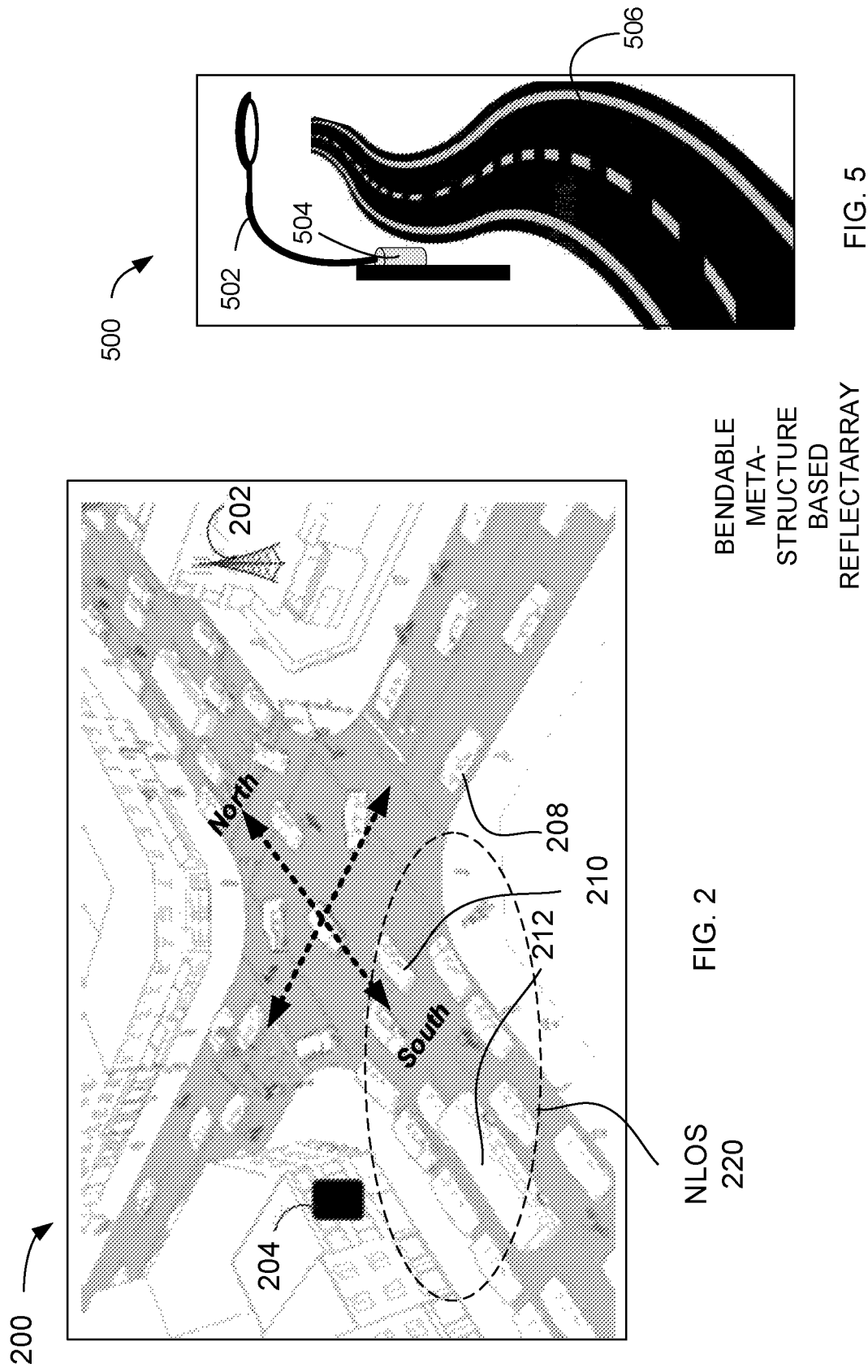
FIG. 2 illustrates a city environment in which a MTS based reflectarray is deployed for 5G applications in accordance to various examples.

FIG. 2 shows a city environment 200 in which a MTS based reflectarray 204 is deployed to significantly improve 5G wireless coverage. Environment 200 is a high traffic, high density city block in which BS 202 provides wireless coverage to a large number of UE, such as WiFi on Bus 212, and communication module in vehicle 210, and autonomous control unit in vehicle 208. Depending on the placement of BS 202, its wireless coverage can be optimized for UE located in the LOS of BS 202 for a given street direction (e.g., North-South). If a UE is located in a perpendicular street direction, then that UE may suffer from diminished coverage. With the millimeter wave spectrum susceptible to environmental effects, the BS 102 may not be able to provide the same wireless performance in all directions. Use of a MTS based reflectarray 204 solves this problem, as RF signals from BS 202 can reflect off of reflectarray 204 to NLOS 220 directions or directions in which wireless coverage and performance are affected by the dense conditions of environment 200. Note that multiple reflectarrays may be positioned throughout the environment 200; the reflect array 204 and the NLOS 220 are provided as an example.

Figure 3:
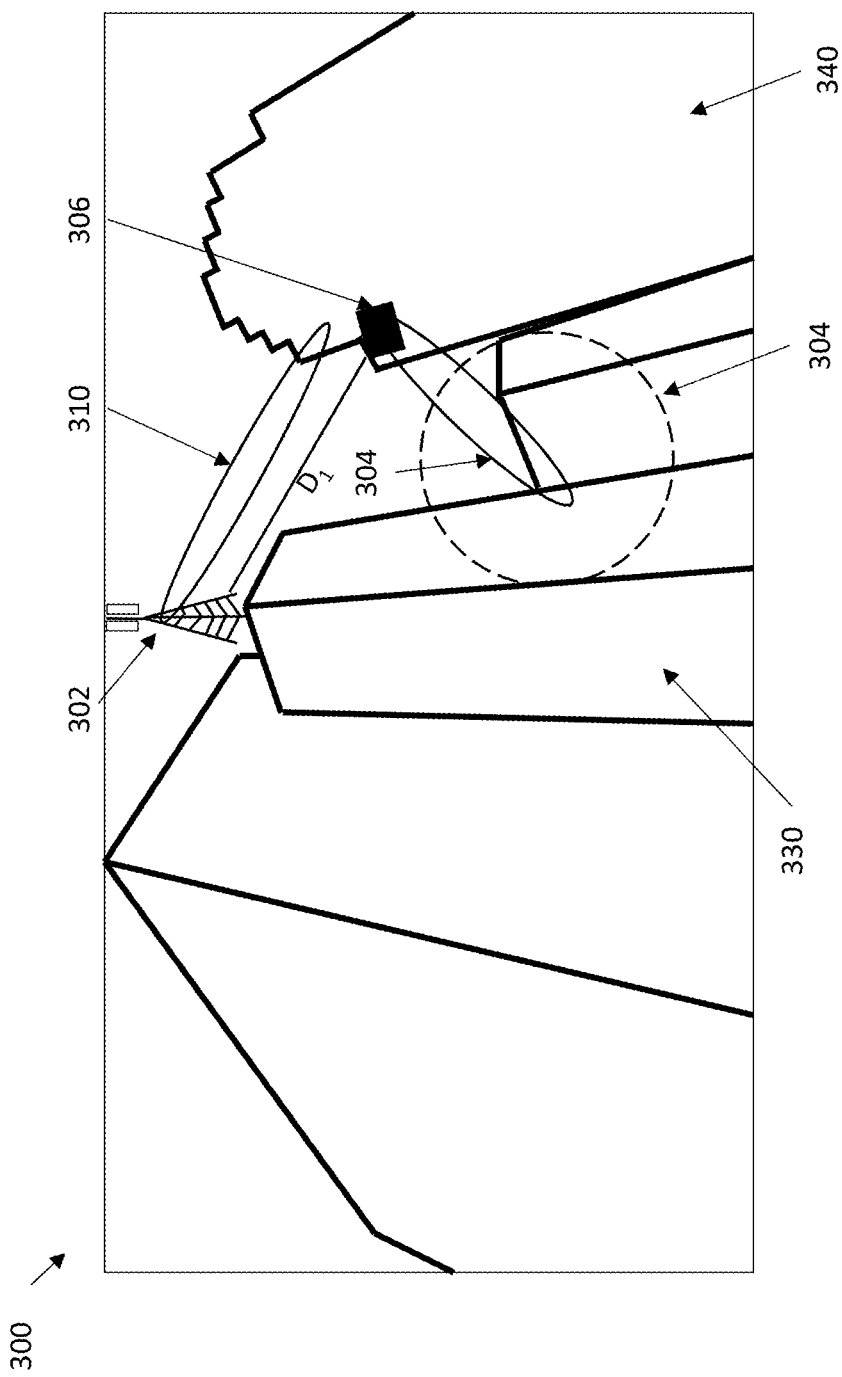
FIG. 3 illustrates another environment in which a MTS based reflectarray can be deployed to significantly improve 5G wireless coverage and performance in accordance to various examples.

FIG. 3 shows another environment 300 in which a MTS based reflectarray 306 is deployed to significantly improve 5G wireless coverage and performance. In environment 300, BS 302 is located on top of a building that makes it difficult for it to provide good wireless coverage and performance to UE within the environment 300, including UEs that may be located in NLOS area 304. For those UEs and others in environment 300, MTS reflectarray 304 achieves a significant performance and coverage boost by reflecting RF signals from BS 302, such as reflecting directed beam 310 as reflection 304, and in strategic directions. The design of the reflectarray 304 and the determination of the reflection direction(s) for wireless coverage and performance improvements is a function of the geometrical configurations of the environment 300, such as the placement of BS 302 on building 330 and the distance (or relative distance) to reflectarray 304, as well as link budget calculations from BS 302 to reflectarray 304 on building 340 in environment 300, as described in more detail hereinbelow. The reflectarray 304 is in a fixed location and has a fixed reflection behavior; alternate embodiments may implement a reconfigurable Reflectarray, such as to change the reflection behavior, and/or may be repositionable within environment 300. This flexibility may be used where the wireless traffic patterns change.

Figure 4:
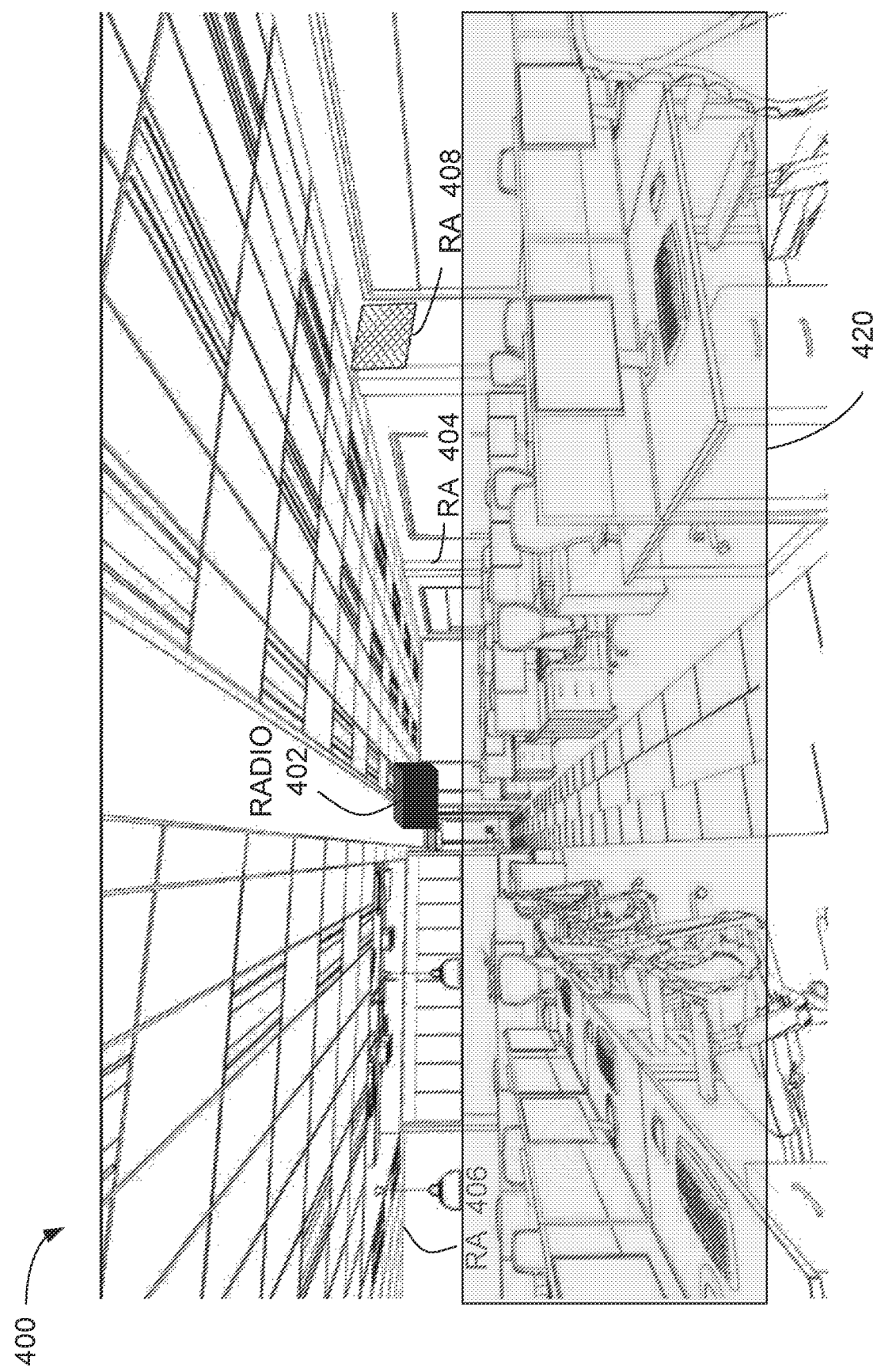
FIG. 4 illustrates placement of MTS reflectarrays in an indoor set up according to various examples.

Note that MTS reflectarrays can be placed in both outdoor and indoor environments. FIG. 4 illustrates placement of MTS reflectarrays in an indoor office configuration according to various examples. Room 400 has a wireless radio 402 placed in one of its corners. Radio 402 provides wireless coverage to UEs in room 400, such as computers and other wireless devices. The radio 402 is positioned for operation within a fixed wireless area, however, the individual UEs or other devices may move within the room 400. There may be any number of UEs in room 400 at any given time with a high demand for high speed data communications. Placement of MTS reflectarrays 404, 406 and 408 is determined by the desired coverage areas and locations to enable RF waves from radio 402 to provide coverage areas in a variety of directions and to provide a performance boost. The areas reached by the radio 402 directly, LOS areas, and the areas that require information but are not within the LOS areas, the NLOS areas, are identified during the set up process. For example, in room 400 there is no need for coverage at the ceiling or floor but within a mid-range area 420 of the room 400. The performance boosts achieved by the MTS based reflectarrays 404, 406, 408 are due to the constructive effect of the directed beams reflected from cells of MTS reflector elements, as each of the reflectarrays 404, 406, 408 is made up of arrays of reflective elements or cells. Note that the constructive effect is achieved with a passive (or active), low cost and easy to manufacture reflectarray that is crucial for enabling 5G applications.

In addition to many configurations, the reflectarrays disclosed herein are able to generate narrow or broad beams as desired. For example, it may be desirable for a narrow azimuth or horizontal beam, with a broad beam in elevation or vertical direction or to generate narrow elevation and broad or fan azimuth beams. This may involve multiple different frequencies, and may be implemented as single, dual, multi-band or broadband, with different materials, and so forth. The reflectarrays can reach a wide range of directions and locations in any 5G environment. These reflectarrays are low cost, easy to manufacture and set up, and may be self-calibrated without requiring manual adjustment to its operation.

Figure 13:
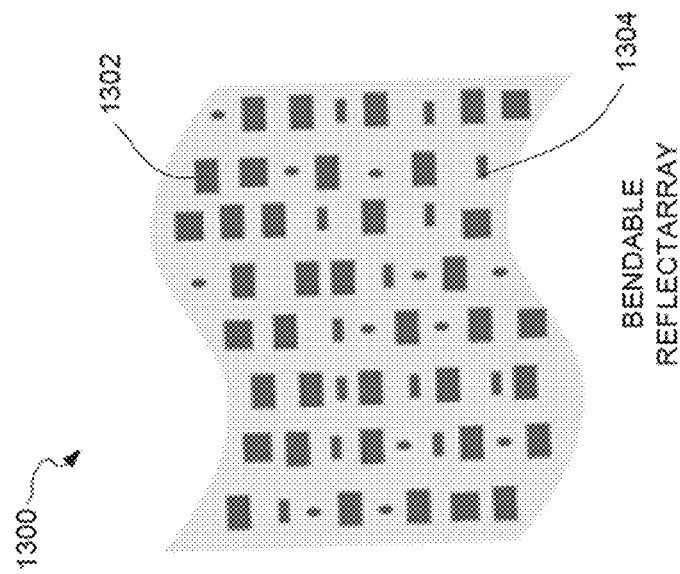
FIG. 13 illustrates a bendable reflectarray in accordance with various examples.

In one example application illustrated in FIG. 5, a reflectarray 504 is mounted to a post 502 or other such structure near a highway or road 506 to provide improved wireless coverage and 5G performance to UE in vehicles navigating the road. In this application, the reflectarray 504 can be a flat rectangular (or other shape) panel mounted to the post or a bendable reflectarray that can curve around the post, as also illustrated in FIG. 13.

Figure 6:
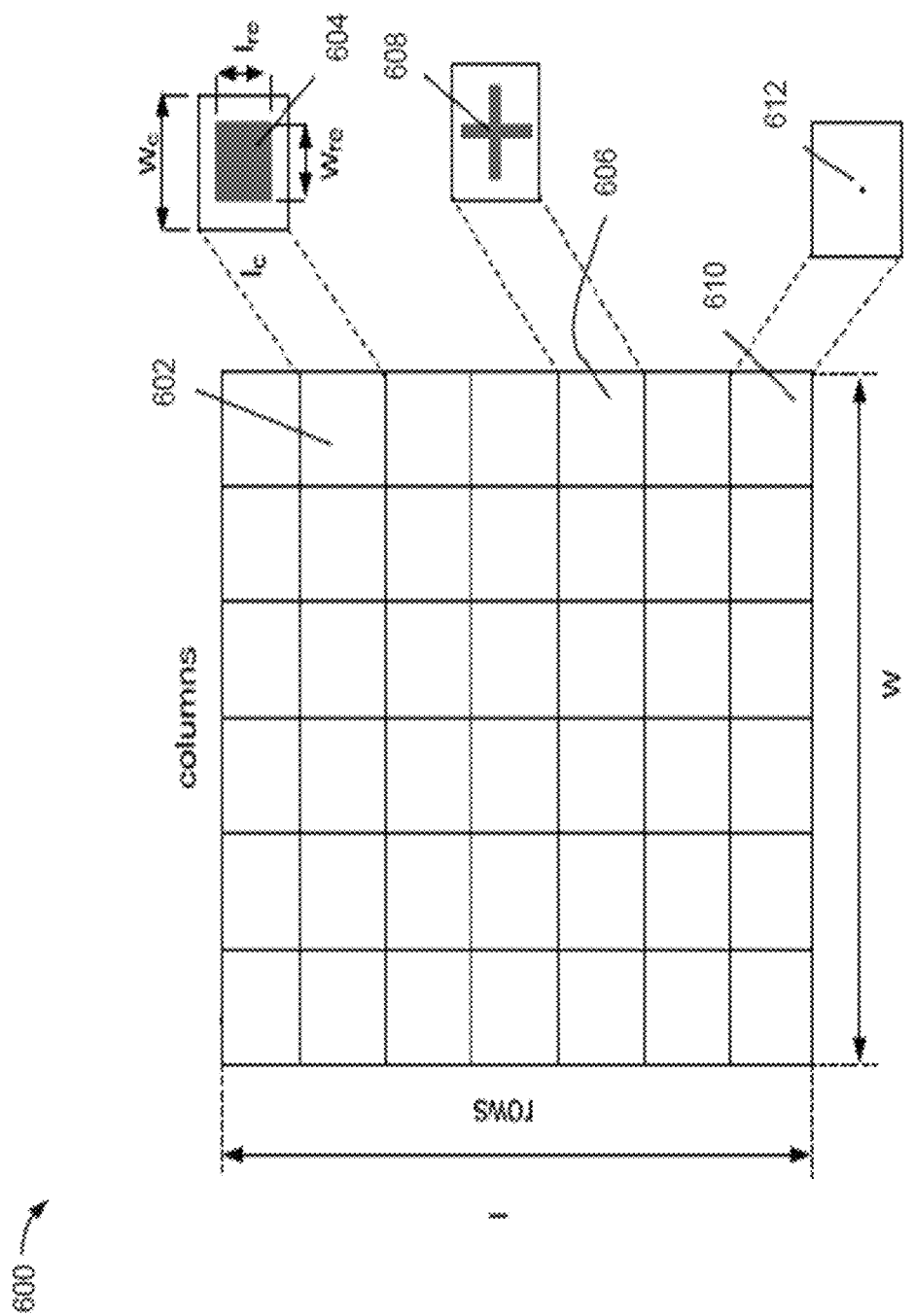
FIG. 6 is a schematic diagram of a MTS reflectarray and its cell configuration in accordance to various examples.

Attention is now directed to FIG. 6, which shows a schematic diagram of a MTS reflectarray 600 and its cell configuration in accordance to various examples. Reflectarray 600 is an array of cells organized in rows and columns. The reflectarray 600 may be passive or active. A passive reflectarray does not require electronics or other controls, as once in position it directs incident beams into a specific direction or directions. To change the direction(s) may require repositioning the entire reflectarray, which can be achieved by means of mechanical or electronically controlled rotating mounts on the back of the reflectarray 600, as illustrated for example, in FIGS. 8-11. The reflectarray 600 provides directivity and high bandwidth and gain due to the size and configuration of its individual cells and the individual reflector elements within those cells.

In various examples, the cells in the reflectarray 600 are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 600 may be a rectangular reflectarray with a length l and a width w. Other shapes (e.g., trapezoid, hexagon, etc.) may also be designed to satisfy design criteria for a given 5G application, such as the location of the reflectarray relative to a wireless radio, the desired gain and directivity performance, and so on. Each cell in the reflectarray 600 has a reflector element, such as reflector element 602. The reflector elements may also have different configurations, such as a square reflector element, a rectangular reflector element, a dipole reflector element, a miniature reflector element, and so on.

For example, cell 602 is a rectangular cell of dimensions $w_c$ and $l_c$ for its width and length, respectively. Within cell 602 is a MTS reflector element 604 of dimensions $w_{re}$ and $l_{re}$. As a MTS reflector element, its dimensions are in the sub-wavelength range (~$\lambda/3$), with $\lambda$ indicating the wavelength of its incident or reflected RF signals. In other examples, cell 606 has a dipole element 608 and cell 610 has a miniature reflector element 612, which is effectively a very small dot in an etched or pattern printed circuit board ("PCB") metal layer that may be imperceptible to the human eye. As described in more detail below, the design of the reflectarray 600 is driven by geometrical and link budget considerations for a given application or deployment, whether indoors or outdoors. The dimensions, shape and cell configuration of the reflectarray 600 will therefore depend on the particular application. Each cell in the reflectarray 600 may have a different reflector element, as illustrated with the reflectarray 700 shown in FIG. 7. While the cells of reflectarray 600 are illustrated as uniform in size, shape and configuration, other embodiments may include cells of different shapes, sizes and configurations to achieve a reflection behavior. Such reflection behavior may involve a single direction or multiple directions.

Figure 7:
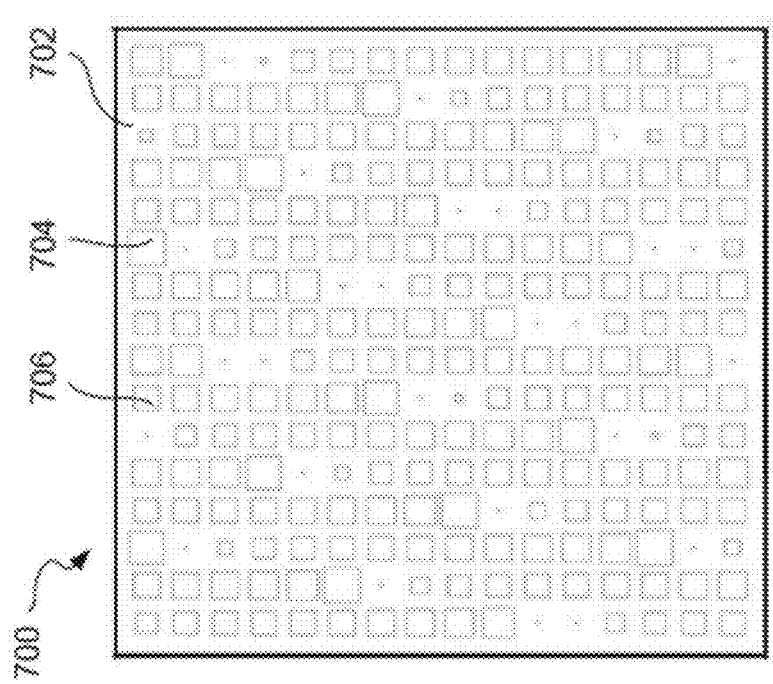
FIG. 7 is an example reflectarray with a variety of cell configurations.

FIG. 7 illustrates a Reflectarray 700 having a variety of cell sizes and shapes, which are organized in an asymmetric configuration. For example, cell 702 is a first size, cell 704 is a second size and cell 706 is a third size. The cells are configured on a surface of the reflectarray 700 structure which may be built on a variety of materials, such as a PCB substrate.

Figure 8:
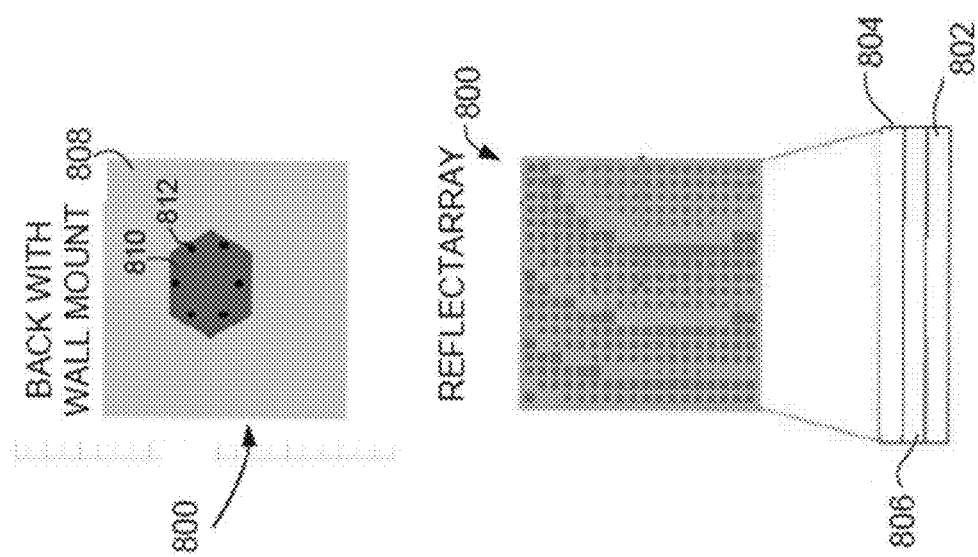
FIG. 8 illustrates a reflectarray with a wall mount in its back surface in accordance with various examples.

FIG. 8 illustrates a reflectarray 800 with a wall mount 810 on a back surface in accordance with various examples. Reflectarray 800 in this example has a high manufacturability as it can be made of low cost PCB materials suitable for high frequency operation. As illustrated, reflectarray 800 has a metal ground plane 802 and a patterned metal layer 804 surrounding a dielectric material 806 sandwiched therebetween. This structure is determined according to the application, placement, size and shape of reflectarray 800. The reflector elements of the reflectarray 800 may be etched or deposited into a metal material to form the patterned metal layer 804. In various examples, the metal ground plane 802 and the patterned metal layer 804 are copper layers surrounding a composite dielectric material. Other materials may be used to design the reflectarray 800 depending on the desired performance of a given 5G application. A back surface 808 can be attached to the ground plane layer 802 of reflectarray 800 to provide a mount 810 for a wall or other like surface. The wall mount 810 may mount to the wall by means of screws 812.

Figure 32:
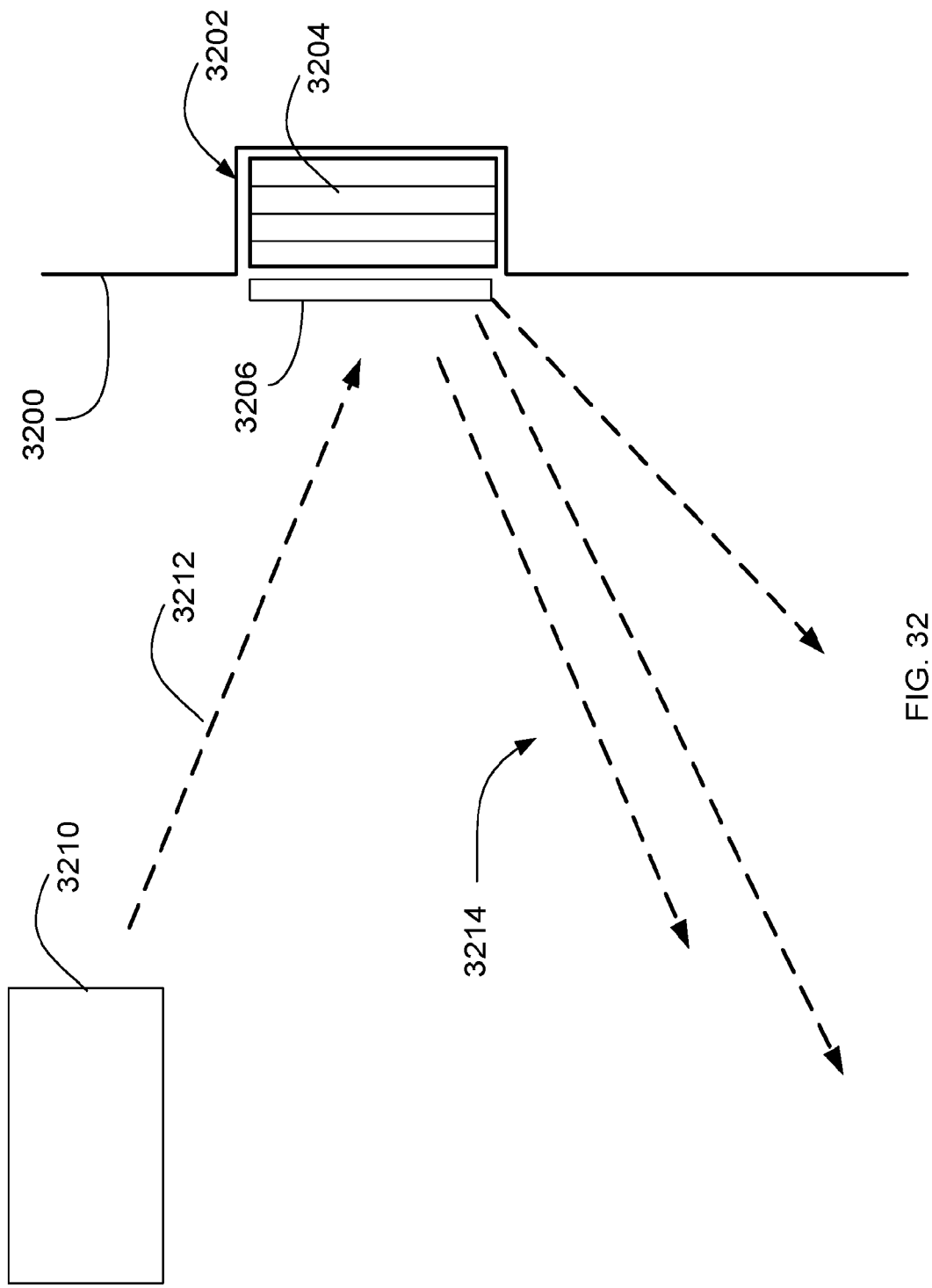
FIG. 32 illustrates a structure for a reflectarray, according to various examples.

There are a variety of configurations that may be implemented, such as to incorporate a reflectarray panel into a pre-sized mounting on the wall of a building. In FIG. 32, a wall 3200 has an insert 3203 for placement of a reflectarray 3204, having multiple layers and an optional cover 3206, such as for advertising. In this position, the radio 3210 transmit beams that are incident on reflectarray 3204, as incident wave 3212. The reflectarray redirects the incident wave 3212 as reflections 3214. While the cover 3206 sits on the front of reflectarray 3204 it does not interfere with the reflective behavior of the reflectarray 3204.

Figure 33:
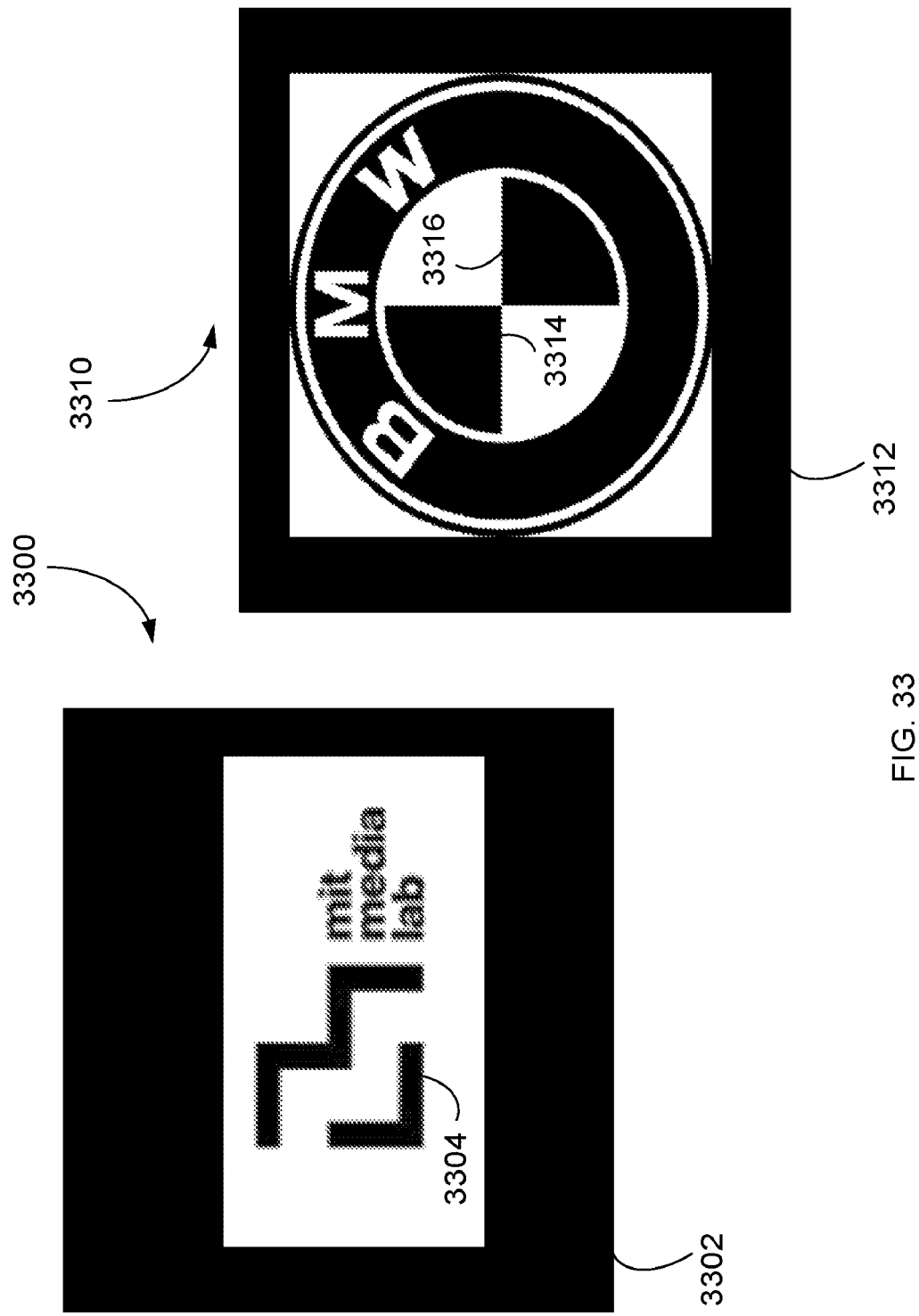
FIG. 33 illustrates a reflectarray modifying overlay, according to various examples.

In some embodiments, the advertisement or cover over the reflectarray may include reflective elements enabling modification of the reflective or redirective behavior of the reflectarray. In FIG. 33, reflectarray 3300 includes an advertisement overlay 3302 having a portion 3304 which is a material acting in coordination with the structure of the reflectarray 3300 to change the angle of reflection or enable a new angle of incidence to achieve the same redirection. In another example, reflectarray 3310 includes an overlay 3312 advertising for BMW. Built into the design of the overlay 3312 are portions 3314 and 3316, each made of one or more materials that act to modify the behavior of reflectarray 3310. In this example, the portion 3314 creates a first direction for reflections and the portion 3316 creates a second direction for reflections. When the overlay 3312 is removed, the reflectarray 3310 performs as originally designed.

Figure 9:
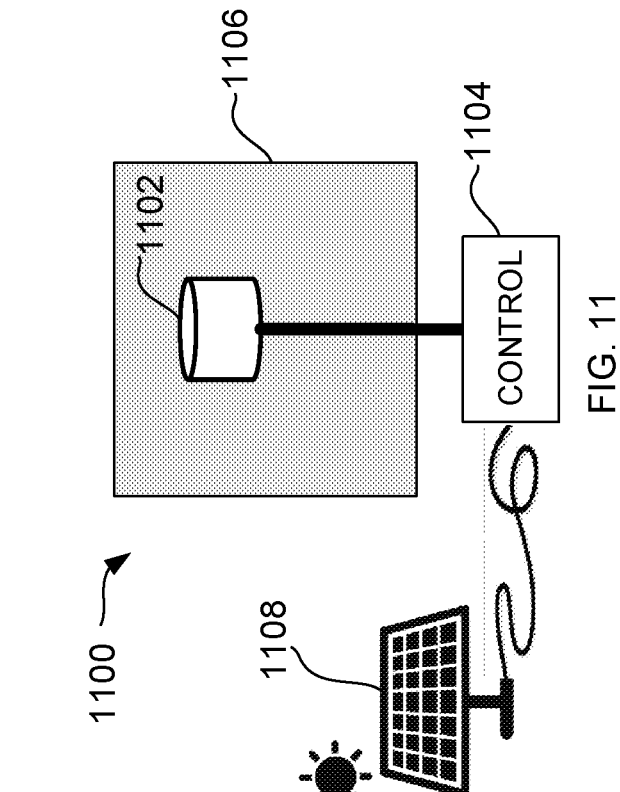
FIG. 9 illustrates a reflectarray with a removable cover in accordance with various examples.

In various examples, a removable cover may be placed on top of the reflectarray as desired by the application. This cover or overlay may provide additional revenue for a user or may provide additional functions or features, such as to have a QR code to purchase sodas at a sports arena or to purchase tickets at a play. There are a variety of aspects to this formation. As shown in FIG. 9, reflectarray 900 has a removable cover 902 that may be positioned on top of the reflectarray by various means, such as by glue, silk screening, or other such means. During the design process of the reflectarray 900 various cover materials may be used that will not interfere with the directivity performance of the reflected RF signals. For example, a fiberglass or other such material may be used to avoid modification or interference with performance. In various examples, the reflectarray 900 may be designed and simulated with the removable cover 902 to ensure that the reflectarray cells and their reflector elements will provide the desired performance. The removable cover 902 may serve a dual purpose to protect the reflectarray 900 from environmental or other damage to its surface and to enable 5G providers, emergency response systems, and others to show messages, advertisements or promotions in the reflectarray 900 that are viewable by UE within its vicinity. There may be various configurations of cover 902 that enable ads and messages to be relayed from the reflectarray 900 mounted to a surface via back mount 906.

Figure 10:
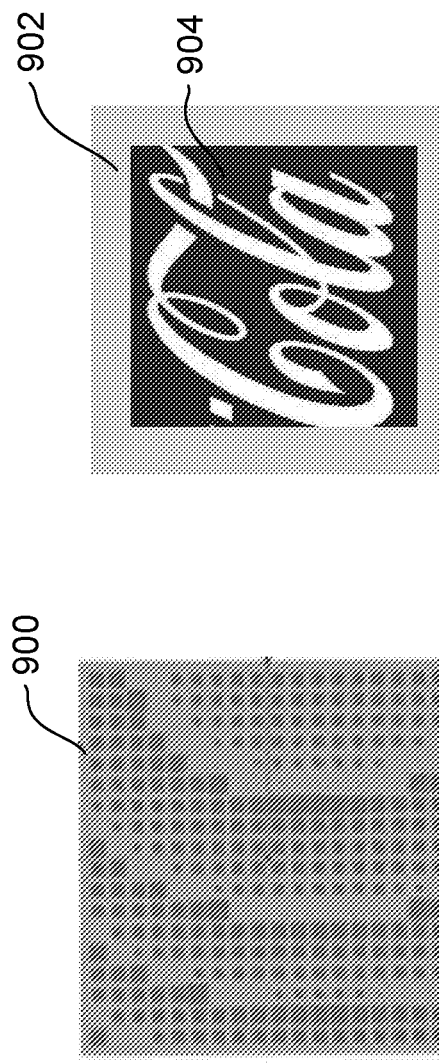
FIG. 10 illustrates a reflectarray with a rotation mechanism placed on its back surface in accordance to various examples.
Figure 11:
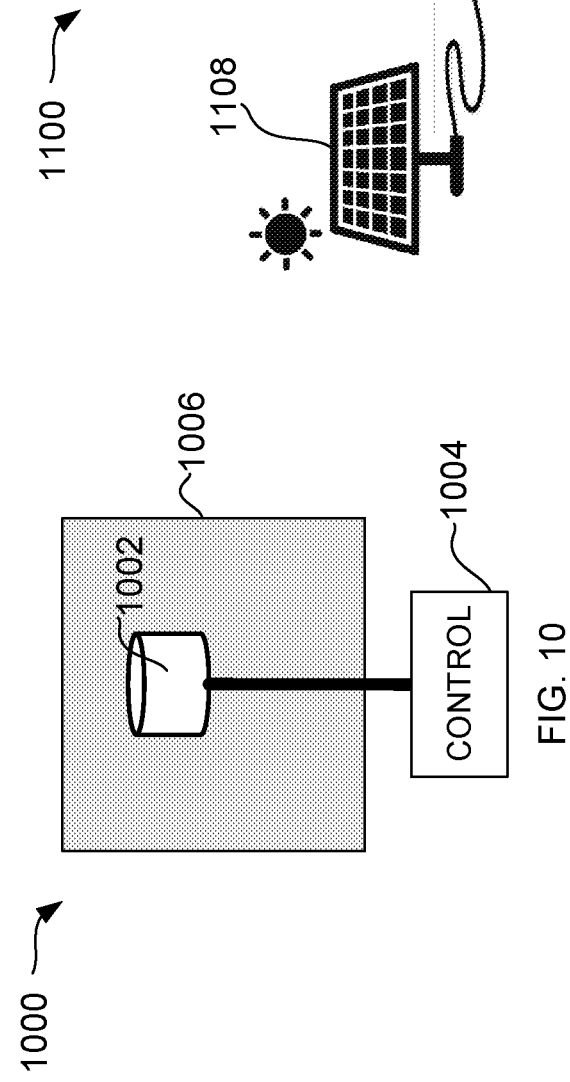
FIG. 11 illustrates a reflectarray with a solar controlled rotation mechanism placed on its back surface in accordance to various examples.

Note that there may be various applications that may require the reflectarray to change its position without having to place another reflectarray in the environment. FIG. 10 illustrates an example reflectarray 1000 that has a rotation mechanism 1002 placed on its back surface 1006 that may be mountable to a wall or other such surface. The rotating mechanism 1002 may be controllable by control circuit 1004 to change the orientation of the reflectarray 1000 as desired. The rotation mechanism can also be controlled by other means other than control circuitry 1004, such as, for example, a solar cell. FIG. 11 illustrates such a reflectarray 1100 in which a rotating mechanism 1102 on back surface 1106 is controlled by solar cell 1108.

Figure 12:
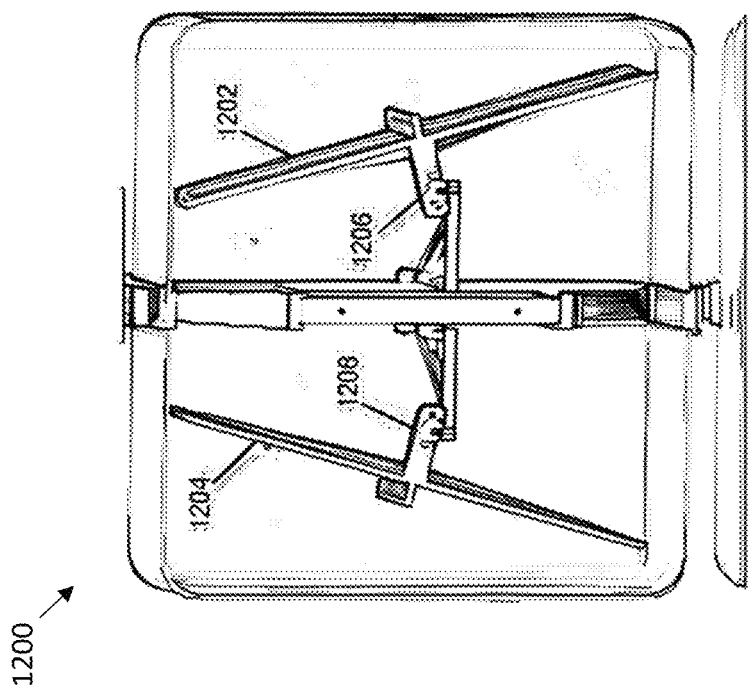
FIG. 12 illustrates a dual reflectarray on a rotating mount in accordance with various examples.

Other configurations of rotating reflectarrays may be implemented as desired. FIG. 12 illustrates an example of a dual reflectarray on a rotating mount. Structure 1200 is designed to support two reflectarrays: reflectarray 1202 and reflectarray 1204. These reflectarrays may be rotated to different orientations by rotating levers 1206 and 1208, respectively. In one example, reflectarray 1202 has a horizontal orientation and reflectarray 1204 has a vertical orientation. Their orientations can be changed as needed by the respective 5G application.

An even more flexible reflectarray in terms of its configuration and placement capabilities is illustrated in FIG. 13. Reflectarray 1300 is a bendable reflectarray that is manufactured of a bendable and flexible PCB material for applications such as that illustrated in FIG. 5, when a bendable reflectarray is shown mounted to a light post near a highway to provide improved wireless coverage and performance to UE in vehicles navigating the highway. The cells within reflectarray 1300 are illustrated as 1302, 1304.

FIG. 14 shows a stackable, slidable reflectarray in accordance to various examples. Reflectarray 1400 is a stackable structure having multiple reflectarray layers. Each reflectarray layer, e.g., reflectarray layers 1402 to 1410, is designed according to its placement in the stack. The stack may be changed as desired by the application, so that at any given time a network operator may remove a reflectarray layer from the stack, e.g., reflectarray layer 1408, while the other reflectarray layers stay in their place or are moved to accommodate the displacement of the reflectarray layer that was removed. Note that this design configuration of reflectarray 1400 enables many different 5G applications to take advantage of the capabilities of reflectarrays to provide high gain to specific directions. The stackable structure of reflectarray 1400 allows 5G network operators to select from a library or catalog of already manufactured reflectarrays to satisfy different design criteria. Similarly, a library or catalog of removable covers may be used with a single or stackable reflectarray. Note that the materials of the reflectarray layers 1402 to 1410 are selected such that RF signals are able to be reflected according to the design criteria. In various examples, a given layer may be a transparent layer able to reflect signals at a given frequency. Each reflectarray layer in the stack may be designed to reflect signals at a different frequency.

Another configuration for a reflectarray is shown in FIG. 15, which illustrates a portable reflectarray 1500 that may be easily transported within a 5G network as desired. The portable reflectarray 1500 may be selected from a library of reflectarrays to achieve a particular need within a 5G network or application. The portable reflectarray 1500 may also be a portable stackable reflectarray as shown in FIG. 14, or have a removable cover as shown in FIG. 9 that is selected from a catalog of covers. The removable cover may be used to display an ad, promotion or message within the 5G network. The portable reflectarray 1500 is easily transportable and may be mounted to a wall or other surface as needed.

Figure 16:
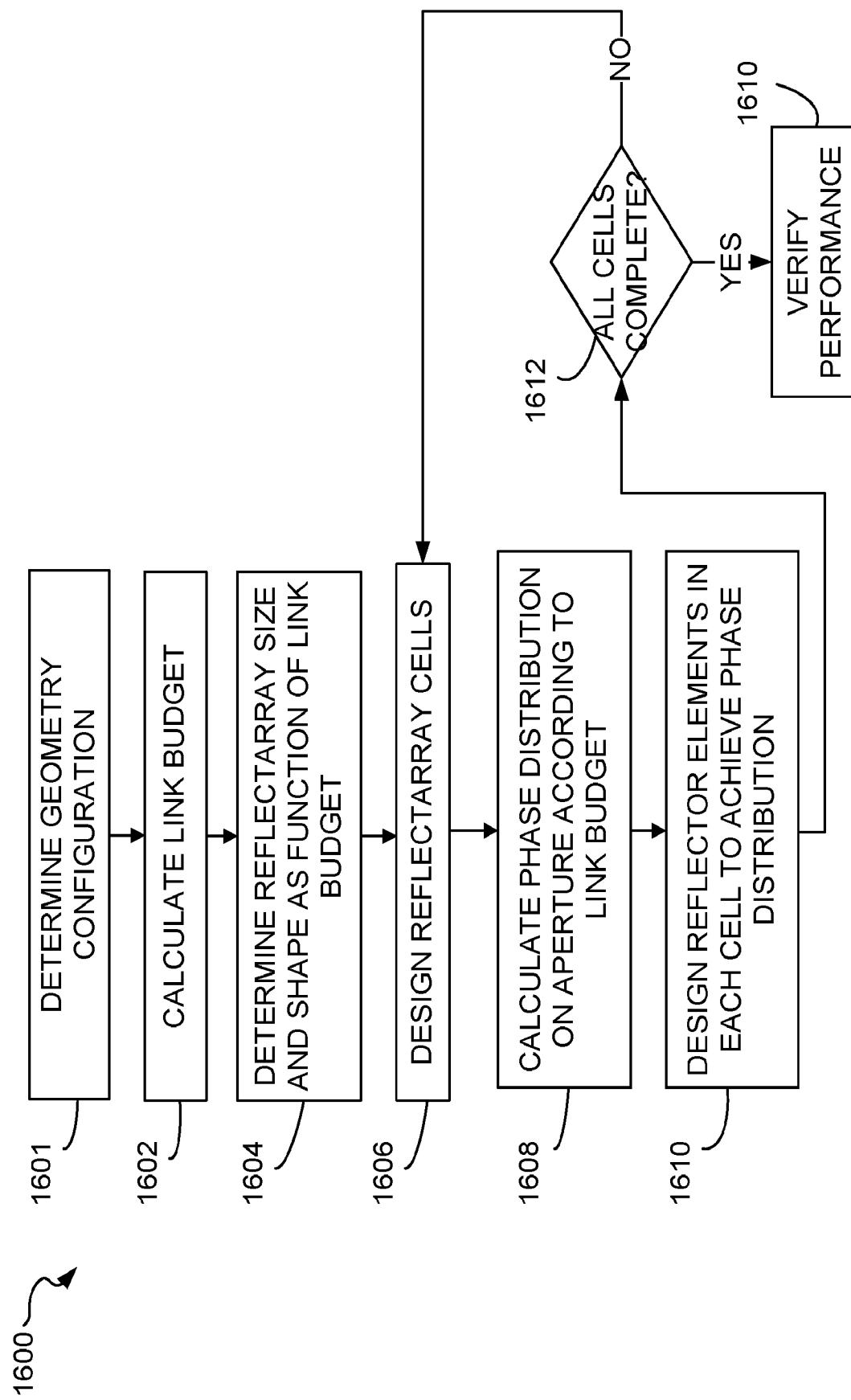
FIG. 16 is a flowchart for designing a reflectarray according to the various examples disclosed herein.
Figure 17:
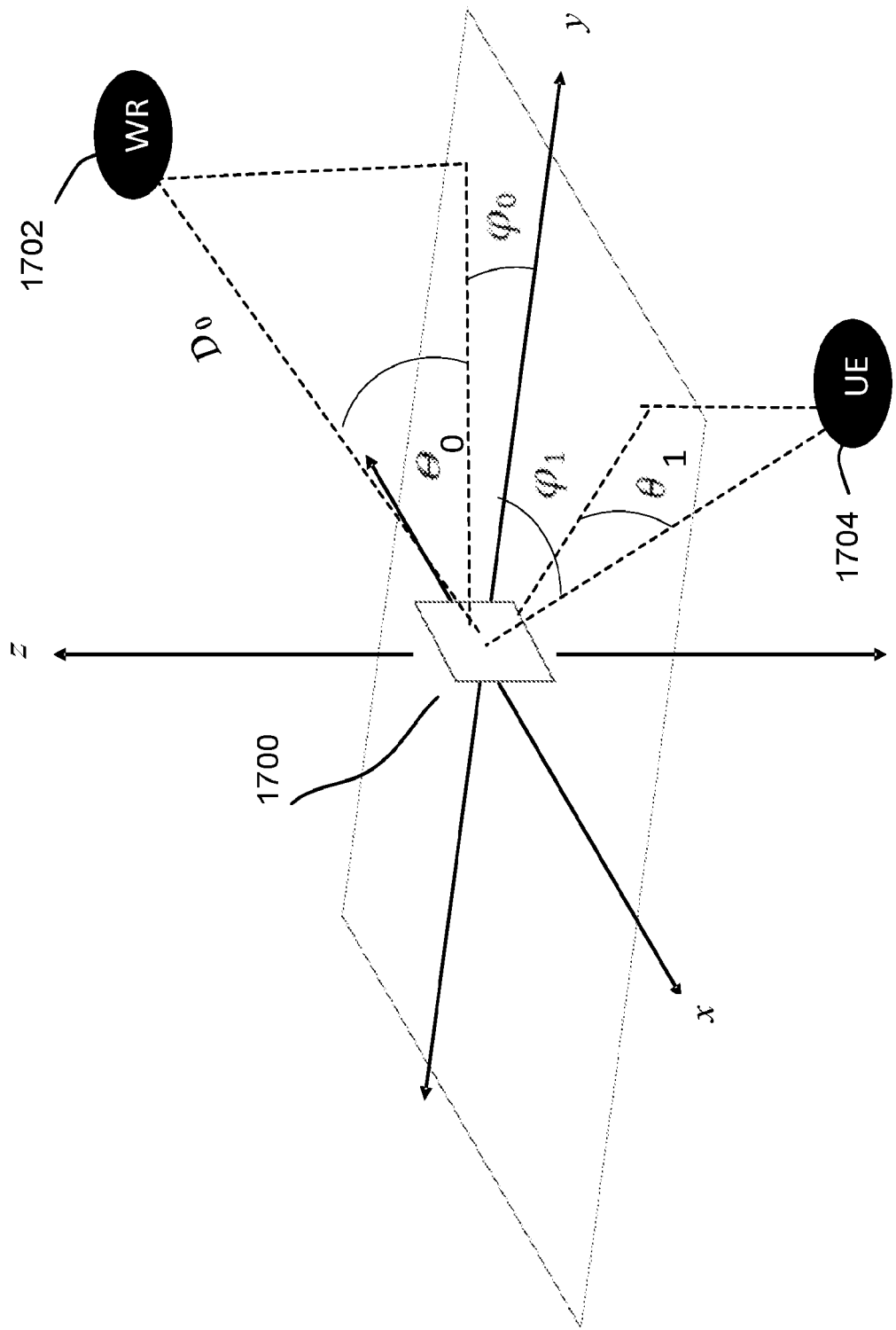
FIG. 17 illustrates a geometrical setup for a reflectarray in accordance to various examples.

Attention is now directed to FIG. 16, which shows a flowchart for a design process 1600 for a reflectarray according to the various examples disclosed herein. The first step in the design process is to determine the geometry setup for the desired 5G application (1601). This involves determining the position of the BS or wireless radio that provides the incident RF signals to be reflected off the reflectarray, including its distance from the reflectarray, and the orientation and position of the reflectarray itself. The geometry setup can be seen in FIG. 17, which shows a wireless radio ("WR") 1702 located at D0 from a Cartesian (x, y, z) coordinate system positioned in the center of the reflectarray 1700. The reflectarray 1700 is positioned along the x-axis with the y-axis indicating its boresight. The WR 1702 has an elevation angle $\theta_0$ and an azimuth angle $\varphi_0$. Note that determining the geometry setup is a simple procedure involving simple geometrical tools such as, for example, a laser distance measurer and an angles measurer. This highlights the ease of setup of reflectarray 1700 and further incentivizes its use when its significant wireless coverage and performance improvements are achieved at low cost with a highly manufacturable reflectarray that can be easily deployed in any 5G environment, whether indoors or outdoors.

Figure 18:
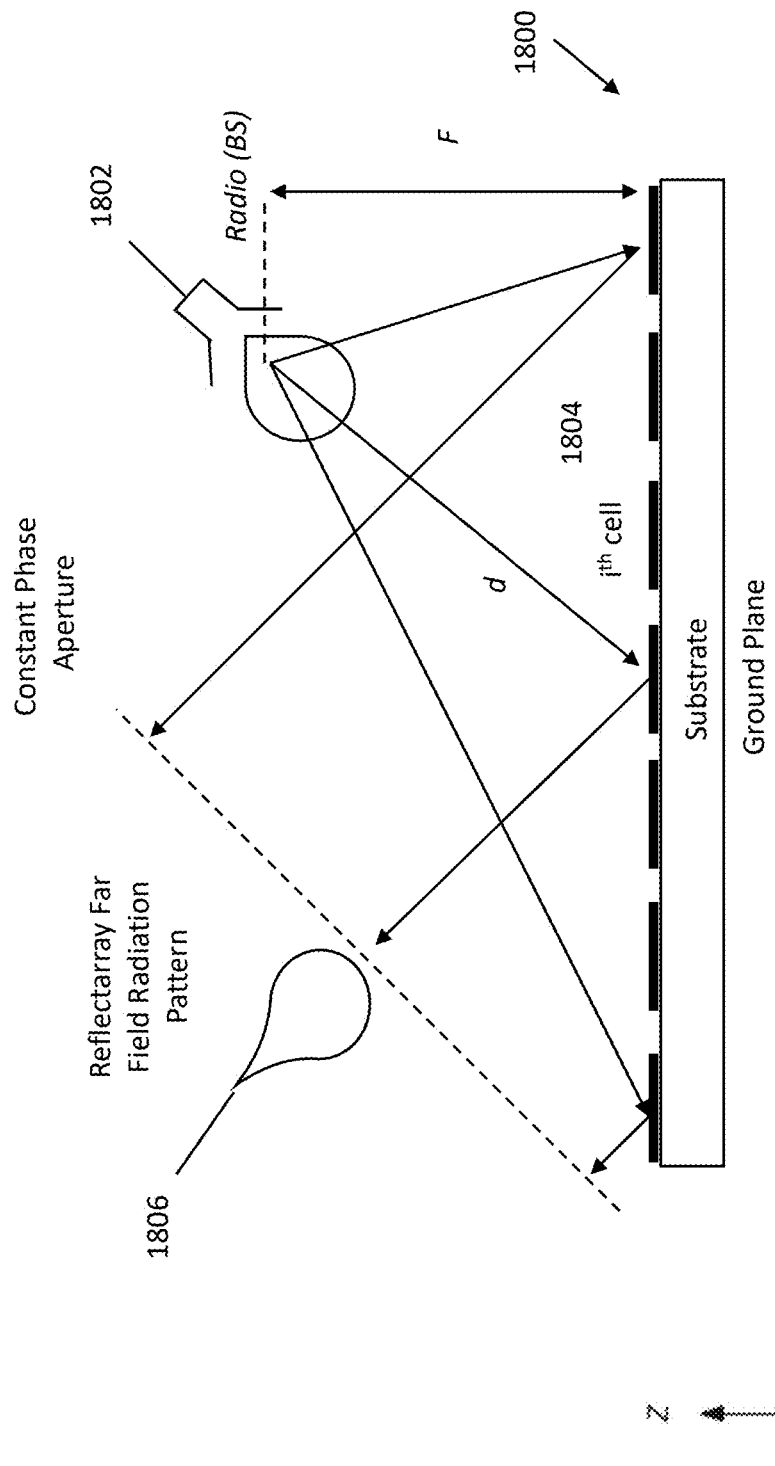
FIG. 18 illustrates a radiation pattern from a reflectarray in accordance to various examples.

The reflectarray 1700 can be used to reflect RF waves from WR 1702 into UE within the 5G network served by WR 1702, such as, for example, UE 1704 located at a distance D1 from the reflectarray 1700 with $\theta_1$ elevation and $\varphi_1$ azimuth angles. FIG. 18 illustrates a far field radiation pattern 1806 that is generated from reflectarray 1800 having a metal ground plane, a dielectric substrate and a patterned metal layer with the reflectarray cells having reflector elements, e.g., MTS reflector elements. As illustrated, BS 1802 sends RF signals to reflectarray 1800 from a distance d to $i^{th}$ cell 1804. Those RF signals are then reflected from each cell in reflectarray 1800 with RF beams. The constructive behavior of the RF beams from all cells in reflectarray 1800 is effectively an antenna gain that results in significant improvements in wireless coverage and performance to UE receiving the radiation pattern 1806.

Returning to FIG. 16, once the geometry setup is determined, the next step is to calculate a link budget for the 5G application (1602). The link budget is a calculation that takes as inputs parameters identifying the gain profile of the BS (e.g., WR 1702) such as, for example, its center frequency, bandwidth, Tx power (effective isotropic radiation power ("EIRP")), antenna gain (beam-width), polarization, Rx sensitivity, and location (D0, $\theta_0$, $\varphi_0$), and parameters or gain profile of an UE within reach of the BS (e.g., UE 1704) such as, for example, its Tx power (EIRP), antenna gain (beam-width), polarization, Rx sensitivity, and location (D1, $\theta_1$, $\varphi_1$). The output of the link budget calculation determines the size and shape of the reflectarray, as well as its expected gain, beam-width and location in terms of azimuth and elevation angles for both uplink and downlink communications (1604).

Figure 19:
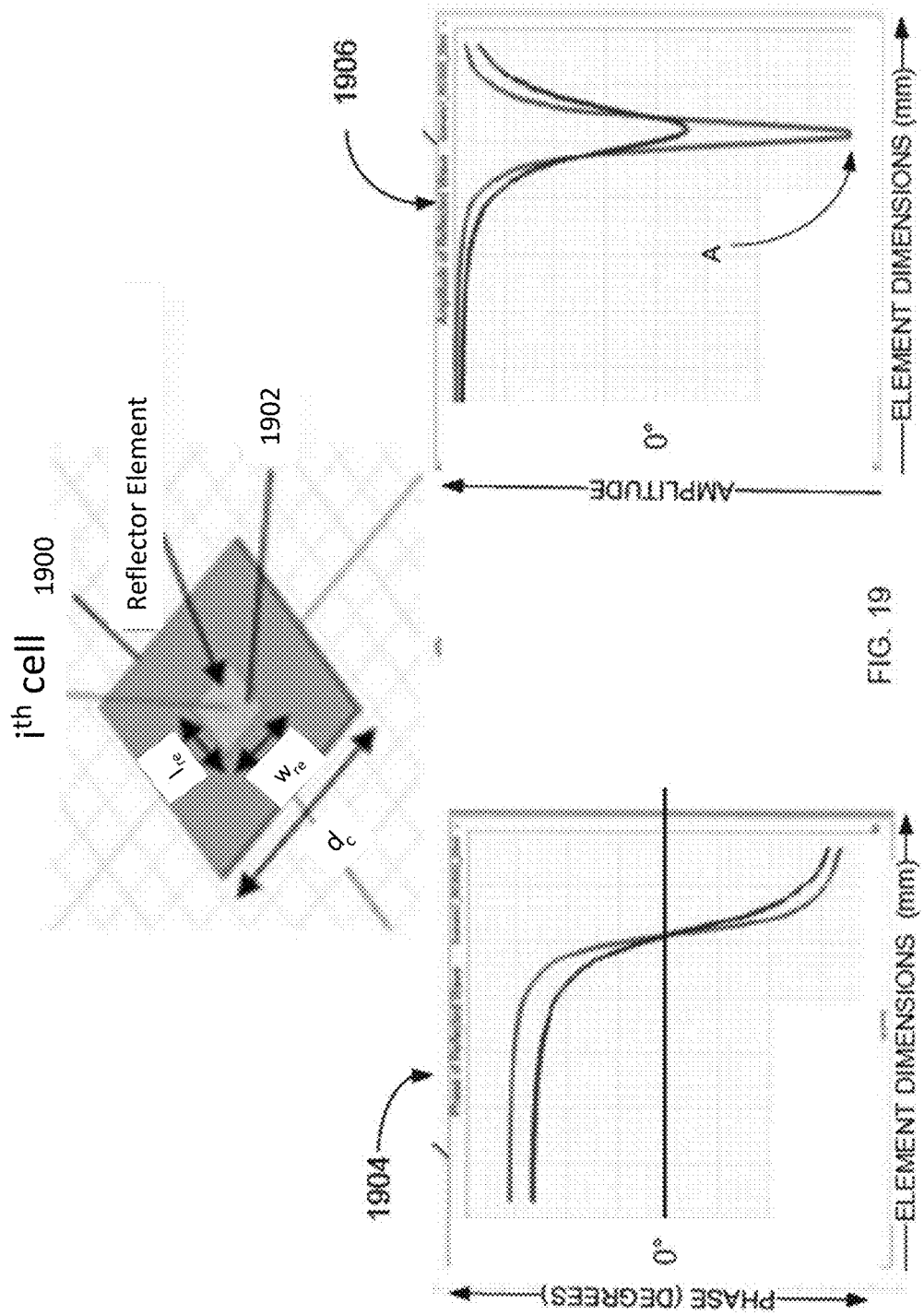
FIG. 19 illustrates a reflectarray cell and its phase and amplitude distribution according to various examples.

Design of the patch or element of a reflectarray cell is illustrated in FIG. 19 where an element having dimensions such as (l×w) for a rectangle is synthesized with results as illustrated in plots 1904, 1906. For a first configuration describing the environmental locations of radio and target areas, the phase behavior (y-axis) for a given element size has a behavior that changes at a specific element size (x-axis). This behavior is used to select a size of the element, which may be a function of one or more dimensions of the element. The plot 1906 illustrates the amplitude of the reflected signal of an element as a function of element size and is used in collaboration with the plot of 1904 to select a size and shape of elements of a reflectarray. In the present inventions, the elements may be periodic or quasi-periodic, wherein the quasi-periodic structure has a gradual shape or size change across the reflectarray. This synthesized information provides information for one or more of the elements of a reflectarray.

FIG. 19 illustrates some of the fundamental graphs used in the design phase of a reflectarray. There are other plots that may be synthesized to capture the full or desired behavior of a reflectarray. For example, where the entire array has a composite reflection behavior, the synthesis may be performed for one or more of the cells to capture the behavior desired. In other embodiments, where multiple reflection behaviors are desired, such as a first reflection directivity from a first portion of the reflectarray and a second reflection directivity from a second portion of the reflectarray. The synthesis is used to determine the results of incident angle and polarization of source signal. The design process finds a shape and size for a specific phase and synthesizes a specific point in the configuration to choose element geometry dimensions. While the plot 1904 gives the phase, the plot 1906 gives a measure of the quality of the reflection and identifies any loss. In plot 1906 there is a high loss area identified at size A. The design process may analyze each cell in the reflectarray and in this way the reflectarray may have a variety of sized cells. These synthesized results are mapped to a physical implementation or phase to geometry. The elements may have a quasi-periodic configuration with shapes that gradually change, such as illustrated in the reflectarray 800 of FIG. 8 and reflectarray 900 of FIG. 9. After determining a size for to achieve phase, the element structure is determined. The completed reflectarray provides a phase distribution which may be verified to ensure the design.

Once the shape and size of the reflectarray are determined, the next two steps can be performed sequentially or in parallel: the phase distribution on the reflectarray aperture is determined according to the link budget (1606) and the reflectarray cells are designed, i.e., their shape, size, and material are selected (1608). The reflection phase, $\varphi_r$, for an $i^{th}$ cell in the reflectarray (e.g., cell 1804 in reflectarray 1800) is calculated as follows:

$$\varphi_r = k_0(d_i - (x_i \cos \varphi_0 + y_i \sin \varphi_0)\sin \theta_0) \pm 2N\pi \quad \text{(Eq. 1)}$$

wherein k0 is the free space propagation constant, $d_i$ is the distance from the BS to the $i^{th}$ cell in the reflectarray, N is an integer for phase wrapping, and $\varphi_0$ and $\theta_0$ are the azimuth and elevation angles for the target reflection point. The calculation identifies a desired or required reflection phase $\varphi_r$ by the $i^{th}$ element on the x-y plane to point a focused beam to ($\varphi_0, \theta_0$). $d_i$ is the distance from the phase center of the BS to the center of the $i^{th}$ cell, and N is an integer. This formula and equation may further include weights to adapt and adjust specific cells or sets of cells. In some examples, a reflectarray may include multiple subarrays allowing redirection of a received signal in more than one direction, frequency, and so forth.

The last step in the design process is to then design the reflector elements in each cell (e.g., their size, shape, type, etc.) to achieve the phase distribution on the reflectarray aperture (1610). The design process steps 1604 to 1610 may be iterated as needed to adjust parameters such as by weighting some of the cells, adding a tapering formulation, and so forth. When all cells are complete (1612) processing verifies performance (1610), else the process returns to design a next cell (1606).

Figure 20:
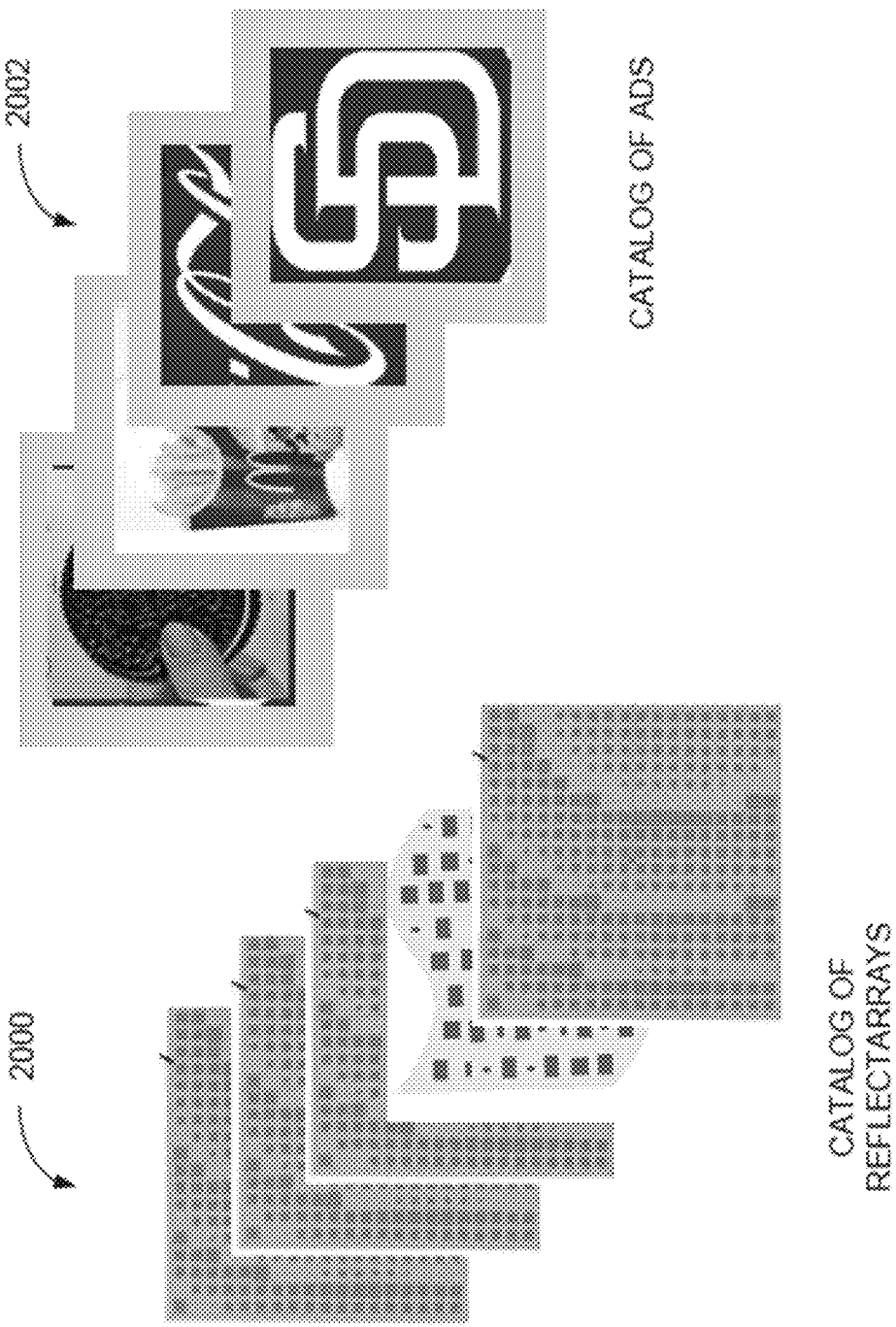
FIG. 20 illustrates a library of reflectarrays and a library of removable covers according to various examples.

FIG. 19 illustrates a reflectarray cell 1900 with a reflector element 1902, e.g., a MTS reflector element, to achieve the phase and amplitude distribution illustrated in graphs 1904 and 1906, respectively. Plot 1904 illustrates phase of a reflected wave as a function of the dimension or size of the radiating patch, such as element 1902. This is illustrated for a first incident angle received at element 1902. The Plot 1906 illustrates amplitude of a reflected wave as a function of the dimension or size of the radiating patch, such as element 1902. This is illustrated for a second incident angle. her Once the reflectarray is designed, it is ready for placement and operation to significantly boost the wireless coverage and performance of any 5G application, whether indoors or outdoors. Note that even after the design is completed and the reflectarray is manufactured and placed in an environment to enable high performance 5G applications, the reflectarray can still be adjusted with the use of say rotation mechanisms as shown in FIGS. 10 to 12 or in a stackable configuration as shown in FIG. 14. The reflectarray can also be manufactured with a bendable PCB for easy placement in structures such as light posts (as shown in FIGS. 5 and 13), be made portable as in FIG. 15, or have removable cover(s) with the option to display ads, promotions or messages to UE and others in the 5G environment (as shown in FIG. 8). The 5G operators can have access to a catalog of reflectarrays 2000 and covers 2002 as illustrated in FIG. 20, or they can request custom made designs of reflectarrays and covers if desired. In addition to many configurations, the reflectarrays disclosed herein are able to generate narrow or broad beams as desired, e.g., narrow in azimuth and broad in elevation, at different frequencies (e.g., single, dual, multi-band or broadband), with different materials, and so forth. The reflectarrays can reach a wide range of directions and locations in any 5G environment. These reflectarrays are low cost, easy to manufacture and set up, and may be self-calibrated without requiring a 5G operator to adjust their operation. They may be passive or active and achieve MIMO like gains and enrich the multipath environment. It is appreciated that these reflectarrays effectively enable the desired performance and high-speed data communications promises of 5G.

Figure 21:
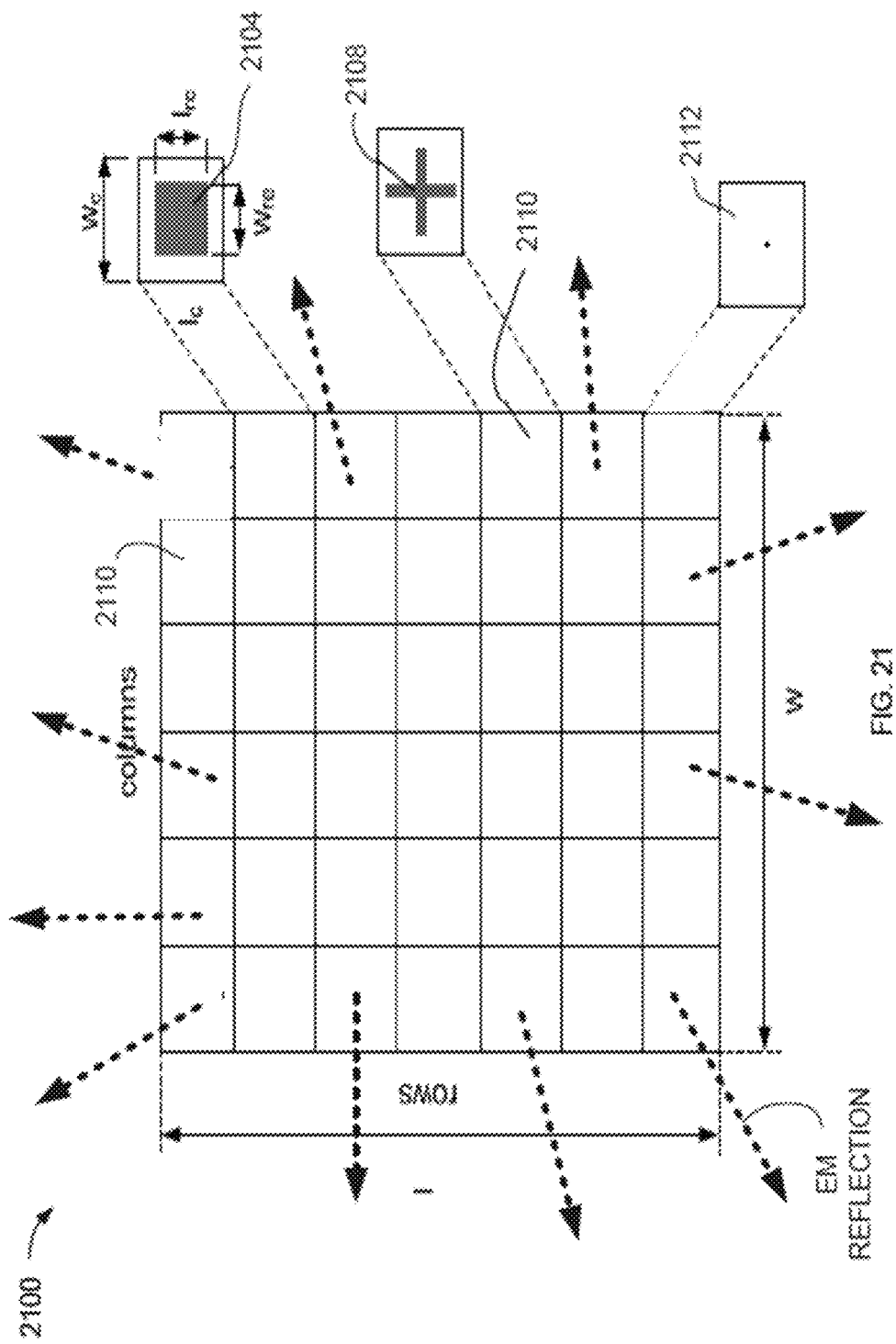
FIG. 21 is a schematic diagram of a MTS reflectarray, where each of the MTS reflector elements of the MTS cells radiates a respective RF beam, in accordance to various examples.
Figure 22:
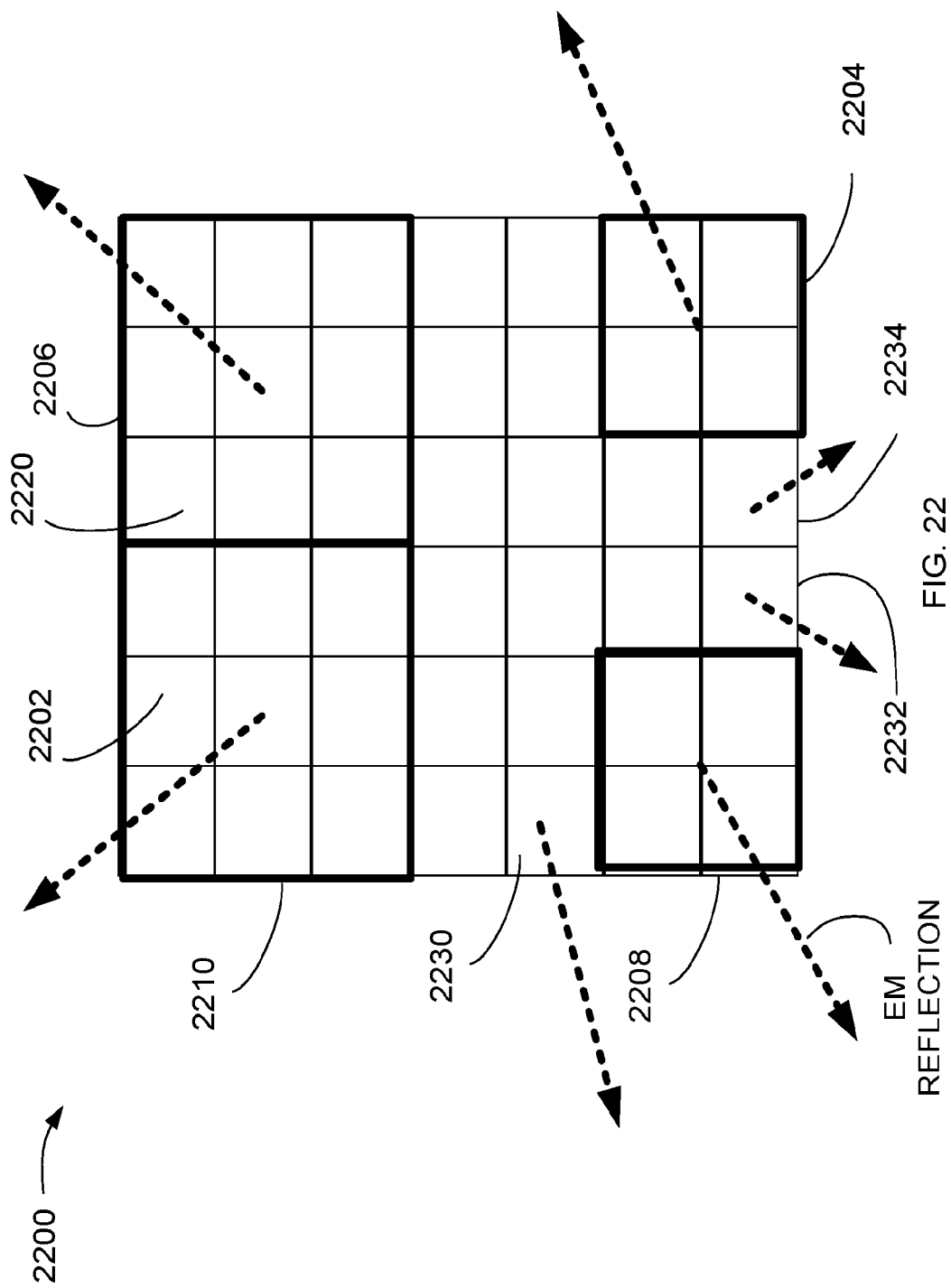
FIG. 22 is a schematic diagram of a MTS reflectarray, where groupings of MTS reflector elements of the MTS cells each radiate a respective RF beam, in accordance to various examples.
Figure 23:
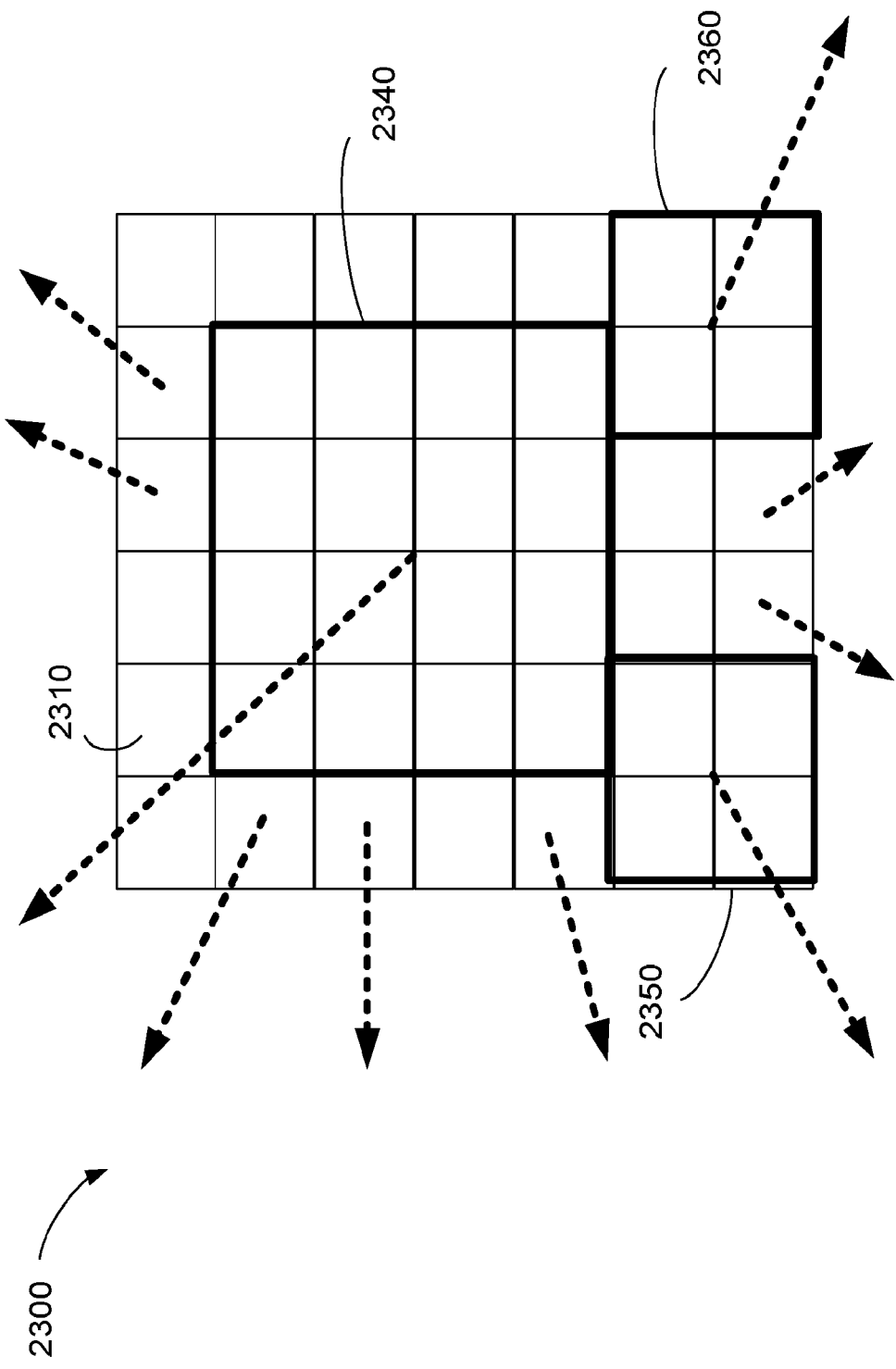
FIG. 23 is a schematic diagram of a MTS reflectarray, where other groupings of MTS reflector elements of the MTS cells each radiate a respective RF beam, in accordance to various examples.

In some applications, it may be desirable for a MTS based reflectarray to generate a plurality of RF beams in order to provide a broader coverage area of the reflected RF signal. In various examples, a MTS based reflectarray may be designed such that it generates a plurality of RF beams, rather than a single RF beam as in previously discussed examples. FIGS. 21, 22, and 23 show MTS reflectarrays 2100, 2200, and 2300 that generate a plurality of RF beams (i.e. reflected EM waves) that radiate in various different directions.

In particular, FIG. 21 is a schematic diagram of a MTS reflectarray 2100, where each of the MTS reflector elements of the MTS cells 2110 radiates a respective RF beam (i.e. a respective reflected electromagnetic ("EM") wave), in accordance to various examples. In this figure, the MTS reflectarray 2100 is shown to be rectangular in shape having a length l and a width w. Although the MTS reflectarray 2100 is shown to be rectangular in shape, the MTS reflectarray 2100 may be designed to be of a different shape (e.g., square, hexagon, trapezoid, etc.) than as shown.

The MTS reflectarray 2100 also shown has a matrix of MTS cells 2110, where each MTS cell 2110 has a width $w_c$ and a length $l_c$. Each MTS cell 2110 comprises a respective reflector element. Various different types of reflector elements may be employed for the reflector elements of the MTS cells 2110 including, but not limited to, a MTS reflector element 2104 (which may have a width $w_{re}$ and a length $l_{re}$), a dipole element 2108, and a miniature reflector element 2112. In addition, each of the MTS cells 2110 may comprise a different type of reflector element than one another. In some examples, the MTS cells 2110 may comprise more than one reflector element as is shown.

For the example of FIG. 21, each of the reflector elements of the MTS reflectarray 2100 is designed to have a respective reflection phase such that each reflector element generates a RF beam directed in a different direction from one another. During operation of the MTS reflectarray 2100, a source (e.g., refer to BS 100 of FIG. 1) transmits a RF signal (e.g., an incident EM wave) towards the MTS reflectarray 2100. The reflector elements (e.g., MTS reflector element 2104, dipole element 2108, and/or miniature reflector element 2112) of the MTS cells 2110 of the MTS reflectarray 2100 receive and reflect the RF signal to each generate a respective RF beam (i.e. a respective reflected EM wave). The phase distribution across the aperture of the MTS reflectarray 2100 is such that each of the generated RF beams is radiated in a different direction from one another. The positioning of the RF beams in various different directions provides for a spreading of the RF signal, which increases the coverage area of the RF signal.

In some applications, it may be desirable for some of the generated RF beams to be stronger in power (e.g., higher in EIRP) than the other generated RF beams. For these applications, MTS reflector elements may be grouped together to generate higher power beams than a single reflector element can generate alone. FIGS. 22 and 23 show MTS reflectarrays 2200, 2300 that have groupings of reflector elements generating RF beams.

In particular, FIG. 22 is a schematic diagram of a MTS reflectarray 2200, where groupings 2202, 2206, 2208, 2210 of MTS reflector elements each radiate a respective RF beam (i.e. a respective reflected EM wave), in accordance to various examples. The reflectarray 2200 of FIG. 22 is structured similarly to the MTS reflectarray 2100 of FIG. 21 with individual cells such as 2202 and 2220. The individual cells, such as cells 2230, 2232, 2234, each are constructed for reflection as well, and the reflective behavior is indicated by the dashed lines.

For the example of FIG. 22, groupings 2206 and 2210 each comprise nine MTS cells, and groupings 2208 and 2204 each comprise four MTS cells; the cells within each of the groupings may be the same design and construction or may be different from each other. The goal is to have the grouping have a reflective behavior as a group, rather than the individual cell reflectivity of an individual cell such as cell 2232. The reflector elements or cells contained within the groupings radiate a respective RF beam per grouping. Each of the generated RF beams radiate in a different direction from one another. It should be noted that since the groupings contain different numbers of cells, they may be designed to generate differing power RF beams.

During operation of the MTS reflectarray 2200, a source transmits a RF signal towards the MTS reflectarray 2200. The reflector elements (e.g., MTS reflector element 2204, dipole element 2208, and/or miniature reflector element 2212) of the MTS cells 2210 of the MTS reflectarray 2200 receive and reflect the RF signal to generate a plurality of RF beams (i.e. reflected EM wave) that are each directed in a different direction from one another. Specifically, the reflector elements of each of the groupings 2230, 2240, 2250, 2260 radiate in unison together to generate a respective RF beam for each of the groupings 2230, 2240, 2250, 2260. And, the reflector elements that are not in any of the groupings 2230, 2240, 2250, 2260 reflect the RF signal to each generate a respective RF beam (i.e. a respective reflected EM wave). The phase distribution across the aperture of the MTS reflectarray 2300 is such that each of the generated RF beams is radiated in a different direction from one another, which allows for an increase in the coverage area of the RF signal.

FIG. 23 is a schematic diagram of a MTS reflectarray 2300, where other groupings 2340, 2350, 2360 of MTS reflector elements of the MTS cells 2310 each radiate a respective RF beam (i.e. a respective reflected EM wave), in accordance to various examples. The reflectarray 2300 of FIG. 23 is structured similarly to the MTS reflectarray 2100 of FIG. 21 and the MTS reflectarray 2200 of FIG. 22. Similar to the MTS reflectarrays 2100, 2200 of FIGS. 21 and 22, the MTS reflectarray 2300 of FIG. 23 is rectangular in shape and comprises a matrix of MTS cells 2310. Additionally, each MTS cell 2310 of the MTS reflectarray 2300 comprises a respective reflector element (e.g., a MTS reflector element 2304, a dipole element 2308, or a miniature reflector element 2312).

For the example of FIG. 23, grouping 2340 comprises eight MTS cells 2310, and groupings 2350 and 2360 each comprise four MTS cells 2310. The reflector elements contained within the groupings 2340, 2350, 2360 of the MTS cells 2310 of the MTS reflectarray 2300 radiate a respective RF beam per grouping 2340, 2350, 2360. Additionally, the reflector elements that are not contained within any of the groupings 2340, 2350, 2360 of the MTS cells 2310 each radiate a respective RF beam per reflector element. Each of the generated RF beams radiate in a different direction from one another. Since the grouping 2340 comprises twice the number of MTS cells 2310 than groupings 2350 and 2360, it is likely that grouping 2340 will be designed to generate a higher power RF beam (e.g., twice the power) than the RF beams generated by groupings 2350 and 2360.

During operation of the MTS reflectarray 2300, a source transmits a RF signal towards the MTS reflectarray 2300. The reflector elements (e.g., MTS reflector element 2304, dipole element 2308, and/or miniature reflector element 2312) of the MTS cells 2310 of the MTS reflectarray 2300 receive and reflect the RF signal to generate a plurality of RF beams (i.e. reflected EM wave). The reflector elements of each of the groupings 2340, 2350, 2360 radiate in unison together to generate a respective RF beam for each of the groupings 2340, 2350, 2360. Also, the reflector elements that are not in any of the groupings 2340, 2350, 2360 reflect the RF signal to each generate a respective RF beam (i.e. a respective reflected EM wave). The phase distribution across the aperture of the MTS reflectarray 2300 is such that each of the generated RF beams is radiated in a different direction from one another, thereby providing increase in the coverage area of the RF signal.

FIG. 24 illustrates a MTS reflectarray 2406 operating as a relay to increase the coverage area of the RF signal in accordance to various examples. In this figure, a wireless BS 2400 is shown that transmits and receives wireless signals to and from mobile devices within its coverage area. Buildings 2402, 2404 and/or other structures located within the coverage area of the BS 2400 can disrupt the transmitting and the receiving of the wireless signals. In particular, in this figure, buildings 2402, 2404 are located within the Line-of-Sight ("LOS") zone of the BS 2400 and, as such, the buildings 2402, 2404 can impede the transmitting and the receiving of the wireless signals, which can degrade the coverage area of the BS 2400.

In order to improve and increase the degraded coverages area of the BS 2400, a MTS reflectarray 2406 is mounted onto an exterior side of building 2402. The MTS reflectarray 2406 operates as a relay between the BS 2400 and a receiving device(s) (e.g., user equipment ("UE")) to increase the coverage area. The MTS reflectarray 2406 is designed such that the MTS reflectarray 2406 will radiate a plurality of RF beams (i.e. reflected EM waves) in different directions from one another. The radiating of the RF beams in the different directions provides for a spreading of the RF signal, which increases and improves the coverage area of the BS 2400.

During operation of the MTS reflectarray 2406, the BS 2400 (e.g., a source) transmits a RF signal (e.g., an incident EM wave) towards the building 2402. The reflector elements of the MTS cells of the MTS reflectarray 2406 receive and reflect the RF signal to generate a plurality of RF beams (i.e. a plurality of reflected EM waves). The phase distribution across the aperture of the MTS reflectarray 2406 is such that each of the generated RF beams is radiated in a different direction from one another, thereby providing for an increase in the coverage area of the RF signal. Since the RF beams are radiated in the various different directions, receiving devices located within the LOS zone as well as within a Non-Line-of-Sight ("NLOS") zone are able to receive the RF signal (i.e. wireless signals).

It should be noted that in some examples, the MTS reflectarray 2406 may be mounted internal to the structure rather than external to the structure (e.g., building 2402) as is shown. In some examples, the MTS reflectarray 2406 may be mounted onto or into other types of objects other than onto structures (e.g., building 2402) as is shown. Other types of objects that the MTS reflectarray 2406 may be mounted onto or into include, but are not limited to, vehicles (e.g., terrestrial vehicles, airborne vehicles, space vehicles, and marine vehicles) and electronic devices, which may be stationary or mobile.

FIG. 25 illustrates two MTS reflectarrays 2506, 2507 operating together as relays to increase the coverage area of the RF signal in accordance to various examples. FIG. 25 is similar to FIG. 24, except that FIG. 25 shows an additional MTS reflectarray 2507 mounted onto building 2504. In FIG. 25, wireless BS 2500 transmits and receives wireless signals to and from mobile devices within its coverage area. Buildings 2502, 2504 are located within the coverage area of the BS 2500 and, as such, can disrupt the transmitting and the receiving of the wireless signals.

In order to improve and increase the coverage area of the BS 2500, MTS reflectarray 2506 is mounted onto an exterior side of building 2502 and MTS reflectarray 2507 is mounted onto an exterior side of building 2504. The MTS reflectarrays 2506, 2507 operate together as relays between the BS 2504 and a receiving device(s) (e.g., UE) to increase the coverage area. The MTS reflectarrays 2506, 2507 are designed such that the MTS reflectarrays 2506, 2507 will both radiate a plurality of RF beams (i.e. reflected EM waves) in different directions. The radiating of the RF beams in the different directions provides for a spreading of the RF signal, thereby increasing the coverage area of the BS 2500.

During operation, the BS 2500 (e.g., a source) transmits a RF signal (e.g., an incident EM wave) towards the building 2502. The reflector elements of the MTS cells of the MTS reflectarray 2506 receive and reflect the RF signal to generate a plurality of RF beams (i.e. a plurality of reflected EM waves). The phase distribution across the aperture of the MTS reflectarray 2506 is such that each of the generated RF beams is radiated in a different direction from one another. Then, the reflector elements of the MTS cells of the MTS reflectarray 2507 receive and reflect at least one of the RF beams generated from the MTS reflectarray 2506 to generate a plurality of RF beams. The phase distribution across the aperture of the MTS reflectarray 2507 is such that each of the generated RF beams is radiated in a different direction from one another. Since the RF beams are radiated in different directions, the coverage area of the BS 2500 is improved and increased.

It should be noted that in some examples, more than two MTS reflectarrays 2506, 2507, as is shown, may operate together as relays to increase the coverage area of the RF signal. In some applications, it may be desirable to employ more than two MTS reflectarrays 2506, 2507. For example, additional MTS reflectarrays 2506, 2507 may be employed to overcome multiple structural obstacles (e.g., buildings) to the radiation of the RF signal. If multiple structural obstacles to the RF signal are known, additional MTS reflectarrays 2506, 2507 may be mounted onto or near the known structural obstacles to spread the RF signal to increase the coverage area of the RF signal.

Figure 26:
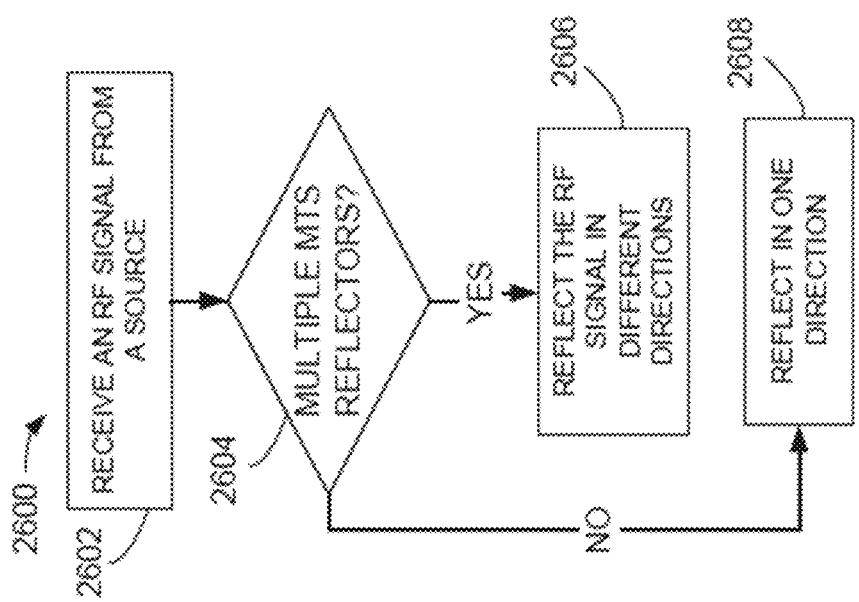
FIG. 26 illustrates a flow chart showing the method for operating the MTS reflectarray according to various examples.

FIG. 26 illustrates a flow chart showing the method 2600 for operating a MTS reflectarray according to various examples. At the start of the method 2600, a plurality of MTS reflector elements on a MTS based reflectarray receive a RF signal from a source (2602). The plurality of MTS reflector elements (2604) then reflect the RF signal to generate a plurality of RF beams (2606), else for a single reflector, there is a single directed beam (2608). Each of the plurality of RF beams is radiated in a different direction from each other.

Figure 27:
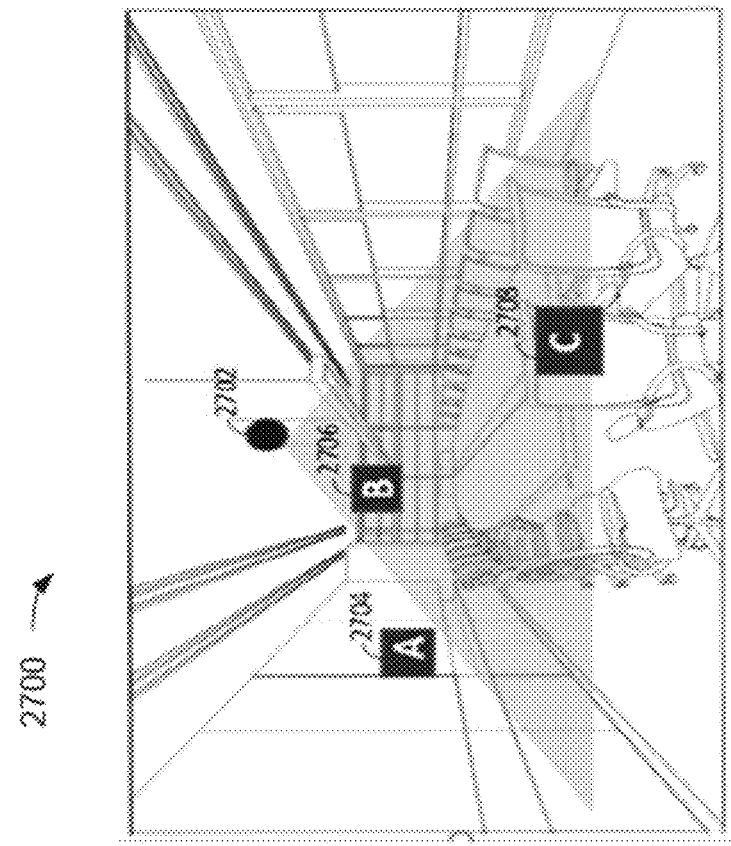
FIG. 27 illustrates a schematic diagram of an example of an indoor environment having a deployment of passive reflectarrays that enrich multipath signaling with a wireless radio at a first location in accordance to various examples.

FIG. 27 illustrates a schematic diagram of an example of an indoor environment 2700 having a deployment of passive reflectarrays that enrich multipath signaling with a wireless radio 2702 at a first location in accordance to various examples. The indoor environment 2700 includes passive reflectarrays 2704, 2706 and 2708 deployed and installed to respective walls in the indoor environment 2700. The wireless radio 2702 is mounted to a ceiling in the indoor environment 2700 such that it is located above each of the passive reflectarrays 2704, 2706 and 2708. The downlink signal from the wireless radio 2702 can illuminate the indoor environment 2700; however, the Signal-to-Noise Ratio (SNR) may be sub-par based on the size of the indoor environment 2700 and propagation losses. The passive reflectarray 2704 may be configured to increase a multipath gain along a path between the passive reflectarray 2704 and a first target coverage area (or zone) within the indoor environment 2700. The passive reflectarray 2706 may be configured to increase a multipath gain along a path between the passive reflectarray 2706 and a second target coverage area (or zone) within the indoor environment 2700. The passive reflectarray 2708 may be configured to increase a multipath gain along a path between the passive reflectarray 2708 and a third target coverage area (or zone) within the indoor environment 2700. The target coverage areas may refer to the same target coverage area in some implementations, or may refer to different target coverage areas in other implementations.

FIG. 28 illustrates a schematic diagram of an example of an indoor environment 2800 having a deployment of passive reflectarrays that enrich multipath signaling with a wireless radio 2802 at a second location in accordance to various examples. The indoor environment 2800 includes passive reflectarrays 2804, 2806 and 2808 deployed and installed to respective walls in the indoor environment 2800. The wireless radio 2802 is mounted to a corner wall in the indoor environment 2800 such that it is located above the passive reflectarrays 2804 and 2808 and below the passive reflectarray 2806. The downlink signal from the wireless radio 2802 can illuminate the indoor environment 2800; however, the Signal-to-Noise Ratio (SNR) may be sub-par based on the size of the indoor environment 2800 and propagation losses. The passive reflectarray 2804 may be configured to increase a multipath gain along a path between the passive reflectarray 2804 and a first target coverage area (or zone) within the indoor environment 2800. The passive reflectarray 2806 may be configured to increase a multipath gain along a path between the passive reflectarray 2806 and a second target coverage area (or zone) within the indoor environment 2800. The passive reflectarray 2808 may be configured to increase a multipath gain along a path between the passive reflectarray 2808 and a third target coverage area (or zone) within the indoor environment 2800. The target coverage areas may refer to the same target coverage area in some implementations, or may refer to different target coverage areas in other implementations. In this respect, the wireless network coverage area within the indoor environment 2800 is increased (or boosted) when using Multiple-In-Multiple-Out (MIMO) because of the additional gain provided by the passive reflectarray antennas 2804, 2806 and 2808.

FIG. 29 illustrates a schematic diagram of an example of an indoor environment 2900 having a deployment of passive reflectarrays with enhanced uplink signaling to a wireless radio 2902 in accordance to various examples. The indoor environment 2900 includes passive reflectarrays 2904, 2906, 2908 deployed and installed to respective walls in the indoor environment 2900 and passive reflectarray 2910 deployed and installed to a ceiling in the indoor environment 2900. The wireless radio 2902 is located on a table in the indoor environment 2900 such that it is located below the passive reflectarrays 2904, 2906, 2908 and 2910. The passive reflectarray 2904 may be configured to increase a multipath gain of a downlink signal from the wireless radio 2902 along a path between the passive reflectarray 2904 and a first target coverage area (or zone) within the indoor environment 2900. The passive reflectarray 2906 may be configured to increase a multipath gain of the downlink signal from the wireless radio 2902 along a path between the passive reflectarray 2906 and a second target coverage area (or zone) within the indoor environment 2900. The passive reflectarray 2908 may be configured to increase a multipath gain of the downlink signal from the wireless radio 2902 along a path between the passive reflectarray 2908 and a third target coverage area (or zone) within the indoor environment 2900. The passive reflectarray 2910 may be configured to increase a multipath gain of the downlink signal from the wireless radio 2902 along a path between the passive reflectarray 2910 and a fourth target coverage area (or zone) within the indoor environment 2900. The target coverage areas may refer to the same target coverage area in some implementations, or may refer to different target coverage areas in other implementations.

Figure 30A:
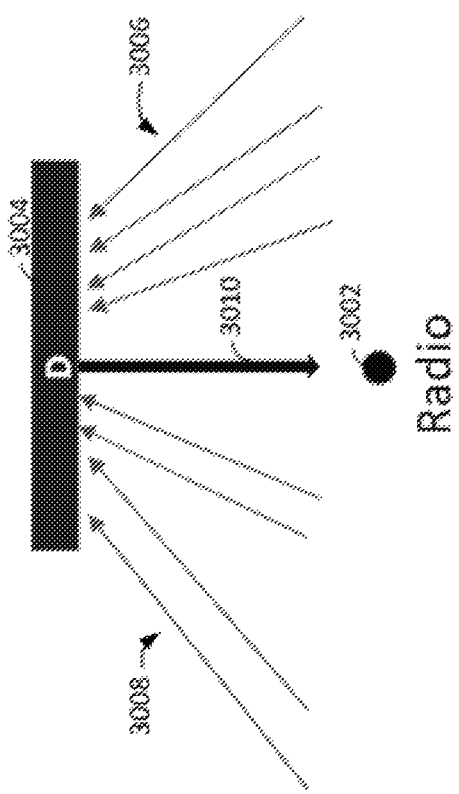
FIGS. 30A and 30B illustrate schematic diagrams of example uplink signaling from a passive reflectarray to a wireless radio in accordance to various examples.
Figure 30B:
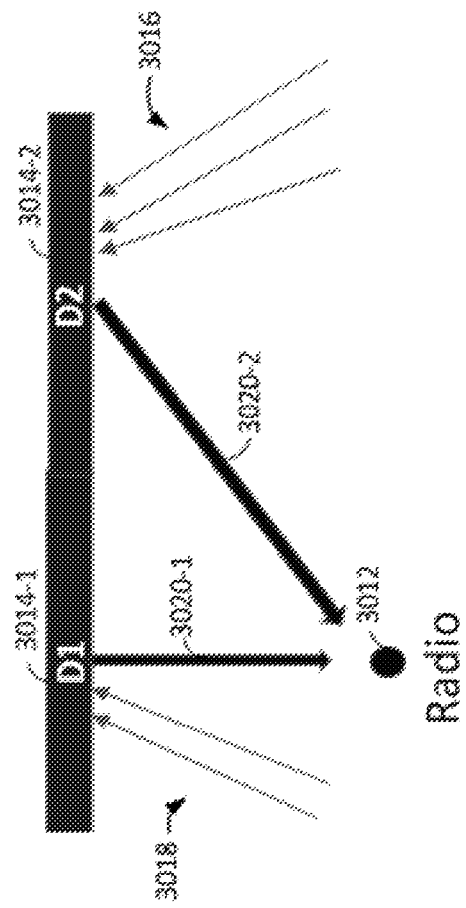

FIGS. 30A and 30B illustrate schematic diagrams of example uplink signaling from a passive reflectarray to a wireless radio in accordance to various examples. Referring back to FIG. 29, in order to improve the uplink signaling from wireless communication devices, such as smartphones or cellular phones, the uplink signaling needs to focus back to the wireless radio 2902 since the cellular phone radiates an RF beam that is wider. As described in FIG. 29, the wireless radio 2902 is located on a table to be in close proximity to user devices, such as cellular phones. In some implementations, the ceiling in the indoor environment (e.g., 2900) may be installed with modular ceiling tiles. In this respect, the ceiling tile may be implemented as, or include at least a portion of, a reflectarray antenna, such as passive reflectarray 2910. In FIG. 30A, a wireless radio 3002 is located below a passive reflectarray 3004 serving as one of the ceiling tiles at a boresight angle. The passive reflectarray 3004 may be configured to receive uplink signaling (e.g., RF beams 3006, 3008) from other passive reflectarrays installed in the indoor environment (e.g., passive reflectarrays 2904, 2906, 2908 of FIG. 29). In some implementations, the passive reflectarray 3004 may be configured to receive RF beams from a large incident angles (e.g., 50°-60°). The surface area of the passive reflectarray 3004 may be larger than those of the other passive reflectarrays installed in the indoor environment, and may be configured to produce a broader beam (e.g., 3010) with the uplink signaling to the wireless radio 3002.

In FIG. 30B, a wireless radio 3012 is located below passive reflectarrays 3014-1 and 3014-2 serving individual ceiling tiles, where the passive reflectarray 3014-1 is located at a boresight angle relative to the wireless radio 3012 and the passive reflectarray 3014-2 is located at an acute angle relative to the wireless radio 3012. The passive reflectarray 3014-1 may be configured to receive uplink signaling (e.g., RF beam 3018) from other passive reflectarrays installed in the indoor environment (e.g., passive reflectarrays 2904, 2906, 2908 of FIG. 29) from a first incident angle direction, and passive reflectarray 3014-2 may be configured to receive uplink signaling (e.g., RF beam 3016) from the other passive reflectarrays installed in the indoor environment from a second incident angle direction. The passive reflectarray 3014-1 may be configured to produce an uplink beam 3020-1 with uplink signaling to the wireless radio 3012 about a boresight angle, and the passive reflectarray 3014-2 may be configured to produce an uplink beam 3020-2 with uplink signaling to the wireless radio 3012 at an acute angle.

Figure 31:
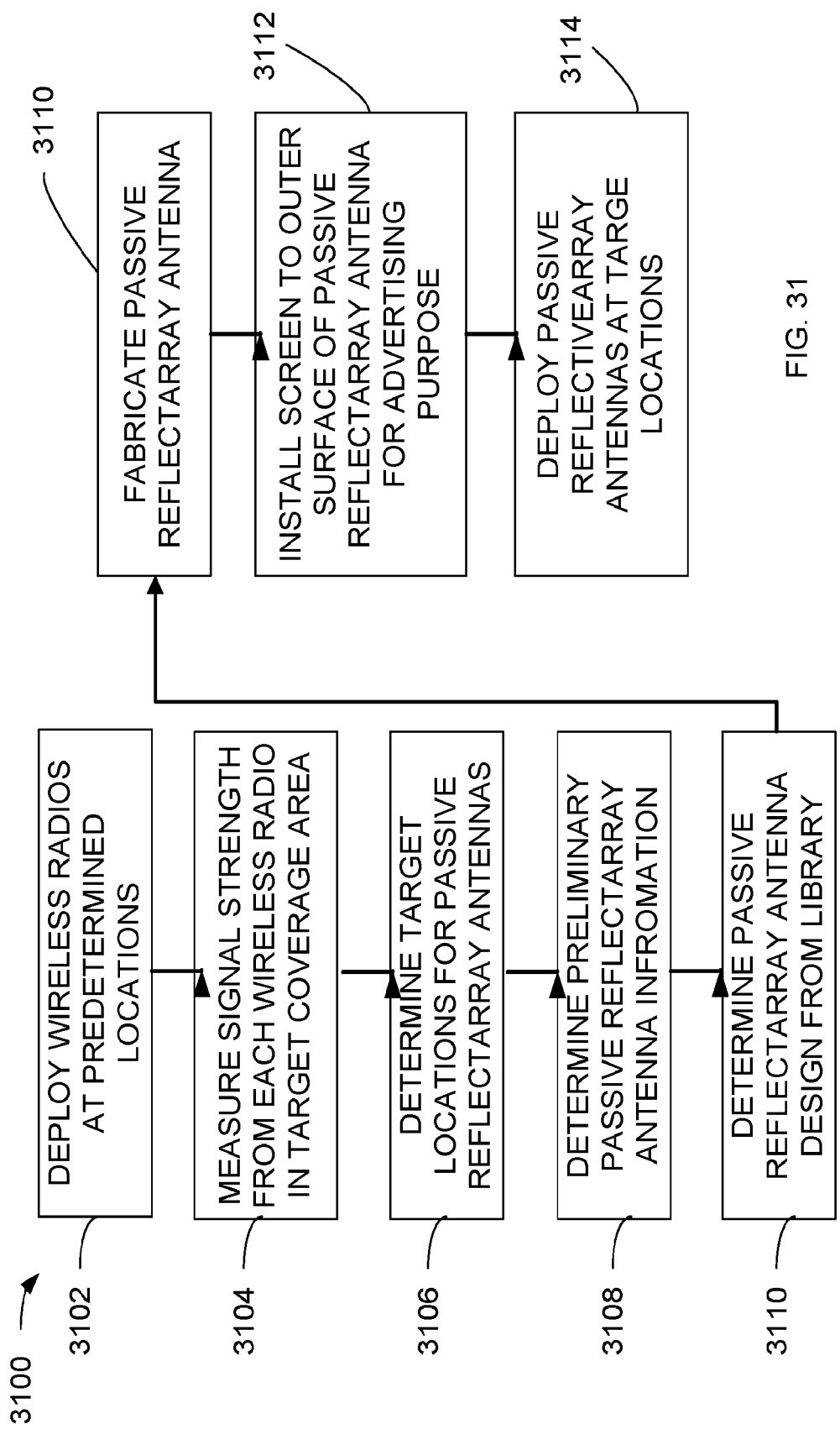
FIG. 31 illustrates a flowchart of an example process of deploying a passive reflectarray in an indoor environment in accordance to various examples.

FIG. 31 illustrates a flowchart of an example process 3100 of deploying a passive reflectarray in an indoor environment in accordance to various examples. For explanatory purposes, the example process 3100 is primarily described herein with reference to FIGS. 21-31; however, the example process 3100 is not limited to the passive reflectarrays of FIGS. 21-31. Further for explanatory purposes, the blocks of the example process 3100 are described herein as occurring in serial, or linearly. However, multiple blocks of the example process 3100 can occur in parallel. In addition, the blocks of the example process 3100 can be performed in a different order than the order shown and/or one or more of the blocks of the example process 3100 are not performed.

The example process 3100 begins at step 3102, where wireless radios are deployed at predetermined locations. For example, a telecommunication service provider may deploy and install base stations associated with a wireless network (e.g., 5G New Radio (NR)) in a desired location of an indoor environment.

Next, at step 3104, the signal strength from each wireless radio deployed in the indoor environment is measured in a target coverage area. For example, the 5G signal strength can be measured in the desired coverage area.

Subsequently, at step 3106, the target locations for passive reflectarray antennas are determined. For example, potential locations, such as walls and ceilings within the indoor environment, can be determined. In some implementations, a light detection and ranging (LiDAR) scan can be conducted to generate high-resolution three-dimensional (3D) maps to execute simulations based on the wireless radio locations and selected passive reflectarray designs and target locations. In some aspects, the target locations may include upper corners and/or centers of walls.

Next, at step 3108, preliminary passive reflectarray antenna information is determined. For example, a target passive reflectarray design can be extracted based on range information (e.g., distance between wireless radio and passive reflectarray antenna) and input/output angles (e.g., incidence angles, reflection angles). In some aspects, the target passive reflectarray design can include designs for specific angles and broader beams with higher gain compared to traditional metallic reflectors.

Subsequently, at step 3110, a passive reflectarray antenna design can be determined from a library that contains indexes to predetermined antenna parameters for a given indoor coverage area scenario. For example, the predetermined antenna parameters may refer to dimensions (e.g., width, height), polarization (e.g., vertical, horizontal), frequency range, bandwidth, gain, input/output azimuth angles, input/output elevation angles, base station beamwidth, passive reflectarray beamwidth, distance between wireless radio and reflectarray, environment (e.g., indoor, outdoor), and so on.

Next, at step 3112, the passive reflectarray antenna is fabricated based on the design parameters determined at step 3110. Subsequently, at step 3114, a screen with content (e.g., advertisements) can be installed or mounted onto an outer surface of the passive reflectarray antenna using fasteners or adhesive material. For example, the telecommunication service provider can monetize with the advertisement screen installed on the passive reflectarray. In some aspects, the screen may be fabricated with a film that is compatible with high-frequencies such that it does not interfere with the performance of the passive reflectarray antenna. The screen may serve as a protective shield for the antenna layer on the passive reflectarray antenna.

Subsequently, at step 3116, the passive reflectarray antenna is deployed at target locations determined at step 3106. In some aspects, the passive reflectarray antenna is deployed and installed irrespective of a wireless radio location based on the indoor space geometry.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item).The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A wireless distribution system, comprising:
   a configuration geometry of components;
   a radio transmitter having a line of sight (LOS) area;
   at least one reflectarray, comprising:
   a substrate;
   a set of reflector elements configured on the substrate, the set of reflector elements arranged to reflect incident waves outside the LOS area; and
   an overlay for the set of reflector elements, wherein the at least one reflectarray is positioned at a distance from the radio transmitter defined by the configuration.

2. The wireless distribution system as in claim 1, wherein the at least one reflectarray includes a first reflectarray and a second reflectarray each positioned to receive incident waves from the radio transmitter and reflect the incident waves into a first area and second area.

3. The wireless distribution system as in claim 2, wherein the first reflectarray has a first directivity and the second reflectarray has a second directivity, and wherein the reflector elements are meta-structure elements.

4. The wireless distribution system as in claim 3, wherein the at least one reflectarray has reciprocal directivity for user signals received from outside the LOS area and reflect the user signals to the radio transmitter.

5. The wireless distribution system as in claim 4, wherein the set of reflector elements comprise a first size element and a second size element different from the first size element.

6. The wireless distribution system as in claim 4, wherein the at least one reflectarray comprises a first grouping of reflector elements having a first directivity and a second grouping of reflector elements having a second directivity.

7. The wireless distribution system as in claim 1, wherein the set of reflector elements is selected from a catalog of reflectarray configurations.

8. The wireless distribution system as in claim 1, wherein the overlay is selected from a catalog of overlays.

9. The wireless distribution system as in claim 1, wherein the overlay comprises a reflector element positioned on the overlay to modify the directivity of the at least one reflectarray.

10. The wireless distribution system as in claim 1, wherein the reflectarray is a passive reflector in a fixed position.

11. A wireless infrastructure component, comprising:
    a substrate;
    a set of reflector elements configured on the substrate, the set of reflector elements arranged to receive directed incident waves from a base station and redirect the incident waves into a target area, wherein the base station has a range for directed beams that is outside the target area; and
    an overlay for the set of reflector elements, wherein the reflector elements are meta-structure elements.

12. The wireless infrastructure component as in claim 11, wherein the wireless infrastructure component is a passive device.

13. The wireless infrastructure component as in claim 12, wherein the base station is a beamforming transmitter.

14. The wireless infrastructure component as in claim 13, wherein the wireless infrastructure component is a reflectarray.

15. The wireless infrastructure component as in claim 14, wherein the wireless infrastructure component is a fixed device in a 5G cellular system.

16. The wireless infrastructure component as in claim 14, wherein the set of reflector elements are grouped into sections, each section having a specific directivity.

17. The wireless infrastructure component as in claim 14, wherein the reflectarray has a reciprocal reflection behavior.

* * * * *